(12) United States Patent
Turgeman et al.

(10) Patent No.: US 12,493,879 B2
(45) Date of Patent: Dec. 9, 2025

(54) USER AUTHENTICATION AND TRANSACTION VERIFICATION VIA A SHARED VIDEO STREAM

(71) Applicant: IRONVEST, INC., New York, NY (US)

(72) Inventors: Avi Turgeman, New York, NY (US); Kfir Yeshayahu, Tzur Yigal (IL); Erez Zohar, Hoboken, NJ (US)

(73) Assignee: IRONVEST, INC., New York, NY (US)

( * ) Notice: Subject to any disclaimer, the term of this patent is extended or adjusted under 35 U.S.C. 154(b) by 281 days.

(21) Appl. No.: 18/123,279

(22) Filed: Mar. 19, 2023

(65) Prior Publication Data

US 2023/0230085 A1 Jul. 20, 2023

Related U.S. Application Data

(63) Continuation-in-part of application No. 17/114,579, filed on Dec. 8, 2020, now abandoned.
(Continued)

(51) Int. Cl.
*G06Q 20/40* (2012.01)
*G06V 40/00* (2022.01)
*H04N 5/272* (2006.01)

(52) U.S. Cl.
CPC ....... *G06Q 20/40145* (2013.01); *G06V 40/00* (2022.01); *H04N 5/272* (2013.01); *G06Q 20/401* (2013.01)

(58) Field of Classification Search
CPC ...... G06V 40/172; G06V 40/45; G06V 40/50; G06V 40/70; G06V 10/454; G06V 10/764;
(Continued)

(56) References Cited

U.S. PATENT DOCUMENTS 6,202,151 B1 3/2001 Musgrave et al.
6,411,725 B1 6/2002 Rhoads
(Continued)

OTHER PUBLICATIONS

International Search Report in PCT/IB2024/052432, dated May 7, 2024.
(Continued)

*Primary Examiner* — Greg C Bengzon
(74) *Attorney, Agent, or Firm* — AlphaPatent Associates Ltd.; Daniel J. Swirsky

(57) ABSTRACT

A user interacts with a remote server via an end-user device, and enters transaction data. A user-facing camera of the end-user device captures a live video feed of the interacting user; which is displayed in real time on the screen of the end-user device while the user is filling-out fields and entering transaction data. The concurrent, real-time, video-feed display of the interacting user, near—or as a background layer behind—the fillable fields of the transaction data, deters at least some cyber-attacks or prevents fraud attempts. Optionally, the screen of the end-user device is also continuously shared, over a secure communication channel, via a locally-installed Screen Sharing Module, with a trusted remote server; which performs continuous biometric authentication of the user, and continuously verifies the integrity of user-provided transaction data against locally-collected data and user interactions. Optionally, a server-side generated QR code or barcode or visual representation, is sent by the trusted remote server and is also displayed on the screen of the end-user device, which is then Screen-Shared back towards the trusted remote server, as an additional security measure.

7 Claims, 11 Drawing Sheets

Related U.S. Application Data

(60) Provisional application No. 62/957,236, filed on Jan. 5, 2020.

(58) Field of Classification Search
CPC .... G06V 10/82; G06V 30/142; G06V 30/418; G06V 40/16; G06V 40/168; G06V 10/17; G06V 20/41; G06V 40/00; G06V 40/161; G06V 40/166; G06V 40/171; G06V 40/18; G06F 21/32; G06F 18/24143; G06F 21/35; G06F 2221/2111; G06F 11/3698; G06F 18/2135; G06F 21/36; G06F 21/64; G06F 2221/2103; H04L 63/0861; H04L 63/08; H04L 63/0807; H04L 63/0815; H04L 63/0853; H04L 2463/082; H04L 63/105; H04L 67/02; H04L 9/3231; H04L 9/3247; H04L 9/3271; G06Q 20/40145; G06Q 10/06398; G06Q 20/10; G06Q 20/401; G06Q 20/4016; G06Q 30/0246; G06Q 30/0277; G06Q 40/02; G06Q 50/01; G06Q 50/265; G07C 9/00; G07C 9/257; G07C 9/26; H04W 12/02; H04W 12/06; H04W 12/65; H04W 88/02; H04N 21/2187; H04N 21/4788; H04N 21/812; H04N 5/272

See application file for complete search history.

(56) References Cited

U.S. PATENT DOCUMENTS

| | | |
|---|---|---|
| 7,801,569 B1 | 9/2010 | Zellner |
| 9,075,975 B2 | 7/2015 | Bud |
| 9,767,613 B1 | 9/2017 | Bedikian et al. |
| 10,372,894 B2 | 8/2019 | Kim et al. |
| 11,030,608 B2 | 6/2021 | Aabye et al. |
| 11,303,845 B2 | 4/2022 | Greaves |
| 11,449,853 B2 | 9/2022 | Kaja |
| 11,461,760 B2 | 10/2022 | Wilson et al. |
| 11,587,083 B2 | 2/2023 | Albisu et al. |
| 11,714,170 B2 | 8/2023 | Smits |
| 2007/0115346 A1* | 5/2007 | Kim ................. H04N 7/148 348/14.02 |
| 2007/0150364 A1* | 6/2007 | Monaghan ......... G06Q 30/0601 705/26.1 |
| 2009/0138405 A1 | 5/2009 | Blessing |
| 2009/0251460 A1* | 10/2009 | Dunnigan ............... G06T 15/50 345/589 |
| 2011/0264922 A1* | 10/2011 | Beaumont .......... H04N 21/4367 713/189 |
| 2012/0246079 A1 | 9/2012 | Wilson et al. |
| 2012/0306632 A1 | 12/2012 | Fleizach et al. |
| 2013/0044920 A1* | 2/2013 | Langley .............. H04W 12/065 382/115 |
| 2013/0218721 A1 | 8/2013 | Borhan et al. |
| 2014/0156512 A1* | 6/2014 | Rahman ............... G06Q 20/326 705/39 |
| 2016/0026995 A1* | 1/2016 | Edmiston ........... G06Q 20/3255 726/9 |
| 2016/0314462 A1* | 10/2016 | Hong .................... H04L 63/083 |
| 2017/0118209 A1* | 4/2017 | Saravanan ........... G06F 18/22 |
| 2017/0186011 A1 | 6/2017 | Lieberman et al. |
| 2019/0213312 A1* | 7/2019 | Tussy ................... G06V 40/70 |
| 2019/0303551 A1 | 10/2019 | Tussy |
| 2020/0111103 A1* | 4/2020 | Kalaboukis .......... G06Q 20/326 |
| 2020/0117325 A1* | 4/2020 | VanBlon ............... G06F 40/279 |
| 2020/0280750 A1 | 9/2020 | Nakamura et al. |
| 2020/0311449 A1 | 10/2020 | Parupati et al. |
| 2021/0097260 A1 | 4/2021 | Verma et al. |
| 2021/0166211 A1 | 6/2021 | Dorsey |
| 2021/0209606 A1 | 7/2021 | Herlands |
| 2022/0004617 A1* | 1/2022 | Irwin, III ................ G06F 21/40 |
| 2022/0375259 A1* | 11/2022 | Banerjee ................ G06V 40/45 |
| 2024/0394711 A1* | 11/2024 | Cvetkovich ........... G06Q 20/18 |

OTHER PUBLICATIONS

Written Opinion of the International Searching Authority in PCT/IB2024/052432, dated May 7, 2024.

* cited by examiner

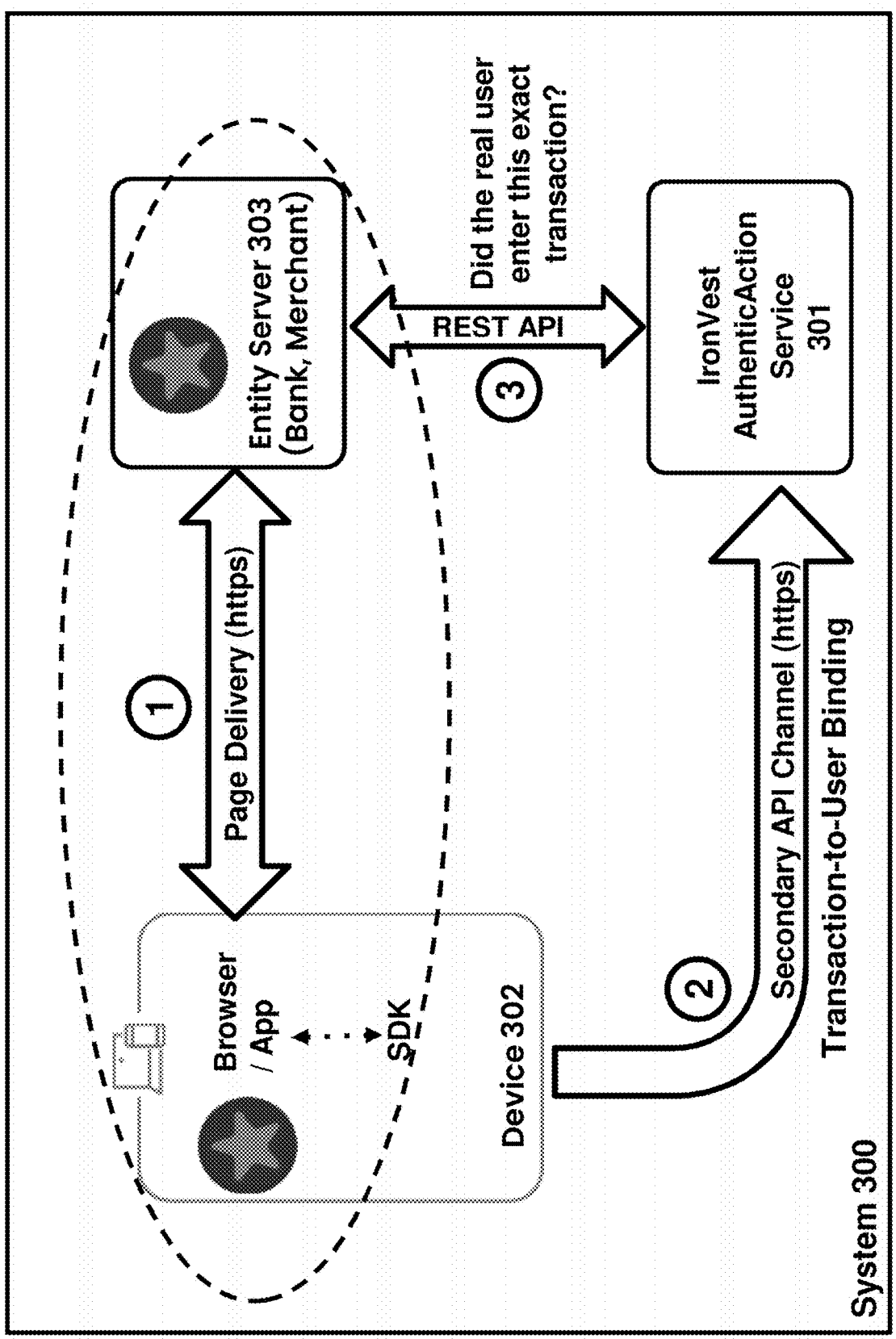

USER AUTHENTICATION AND TRANSACTION VERIFICATION VIA A SHARED VIDEO STREAM

CROSS-REFERENCE TO RELATED APPLICATIONS

This patent application is a Continuation-in-Part (CIP) of U.S. Ser. No. 17/114,579, filed on Dec. 8, 2020, which is hereby incorporated by reference in its entirety; which claims priority and benefit from U.S. 62/957,236, filed on Jan. 5, 2020, which is hereby incorporated by reference in its entirety.

FIELD

The present invention is related to the field of electronic devices and systems.

BACKGROUND

Millions of people utilize mobile and non-mobile electronic devices, such as smartphones, tablets, laptop computers and desktop computers, in order to perform various activities. Such activities may include, for example, browsing the Internet, sending and receiving electronic mail (email) messages, taking photographs and videos, engaging in a video conference or a chat session, playing games, or the like.

SUMMARY

The present invention may include devices, systems, and methods of user authentication and/or transaction verification.

For example, a method comprises: (a) monitoring interactions of a user who interacts with an electronic device to enter transaction data, and extracting one or more biometric traits of the user; (b) generating a unified data-item, that represents a unified fusion of both (i) the transaction data, and (ii) biometric data reflecting the one or more biometric traits of the user that were extracted from interactions of the user during entry of transaction data. For example, the transaction data within the unified data-item that is generated in step (b), cannot be modified or corrupted without also causing modification or corruption of the biometric data within the unified data-item; wherein the biometric data within the unified data-item that is generated in step (b), cannot be modified or corrupted without also causing modification or corruption of the transaction data within the unified data-item. Modification or corruption of the transaction data within the unified data-item, automatically causes modification or corruption of the biometric data within the unified data-item; and modification or corruption of the biometric data within the unified data-item, automatically causes modification or corruption of the biometric data within the unified data-item.

In some embodiments, for example, a user interacts with a remote server via an end-user device, and enters transaction data. A user-facing camera of the end-user device captures a live video feed of the interacting user; which is displayed in real time on the screen of the end-user device while the user is filling-out fields and entering transaction data. The concurrent, real-time, video-feed display of the interacting user, near—or as a background layer behind—the fillable fields of the transaction data, deters at least some cyber-attacks or prevents fraud attempts. Optionally, the screen of the end-user device is also continuously shared, over a secure communication channel, via a locally-installed Screen Sharing Module, with a trusted remote server; which performs continuous biometric authentication of the user, and continuously verifies the integrity of user-provided transaction data against locally-collected data and user interactions. Optionally, a server-side generated QR code or barcode or visual representation, is sent by the trusted remote server and is also displayed on the screen of the end-user device, which is then Screen-Shared back towards the trusted remote server, as an additional security measure.

The present invention may provide other and/or additional benefits or advantages.

BRIEF DESCRIPTION OF THE DRAWINGS

FIG. 3 is an illustration that demonstrates a system and its flow of operations, in accordance with some demonstrative embodiments.

DETAILED DESCRIPTION OF SOME DEMONSTRATIVE EMBODIMENTS

Figure 1:
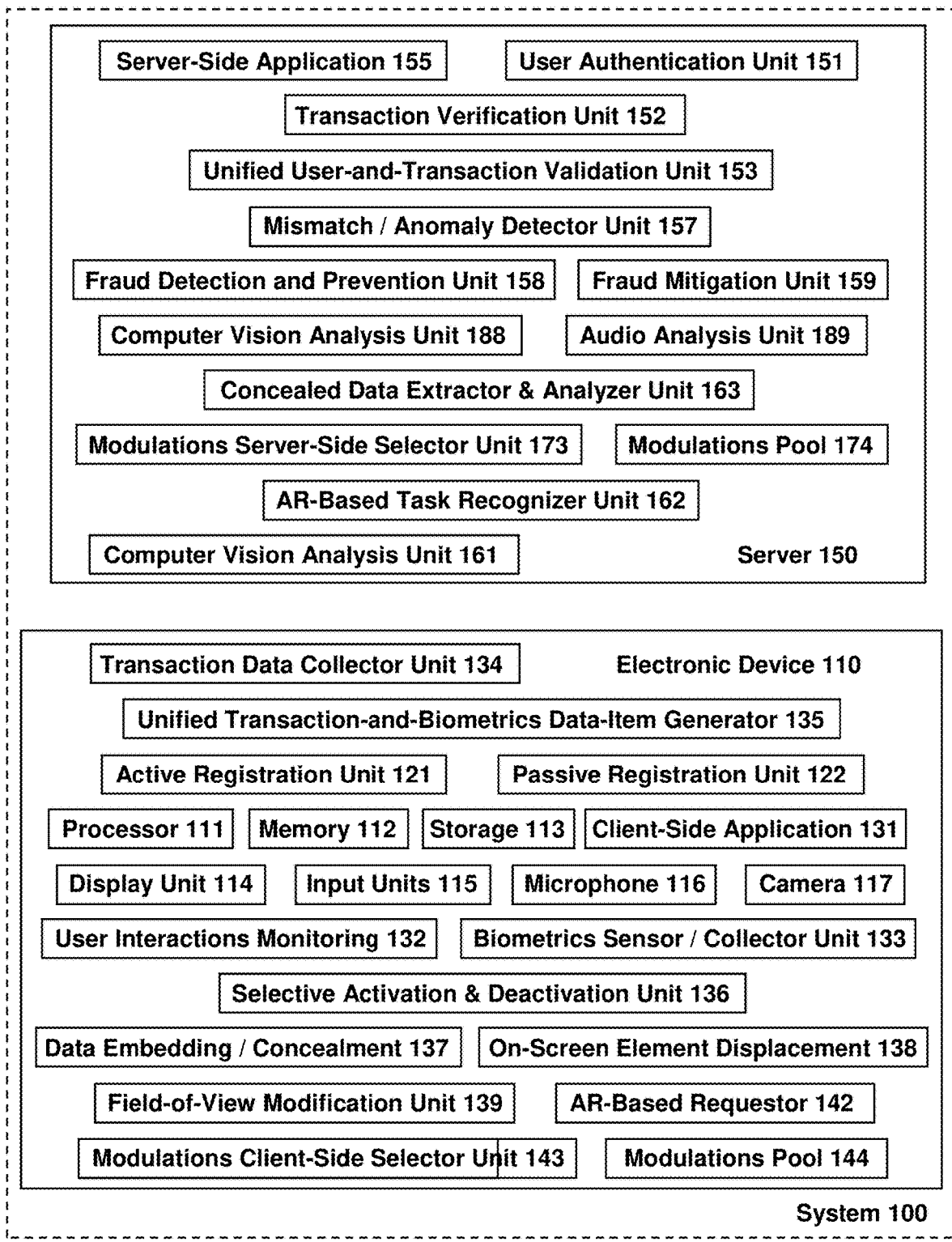
FIG. 1 is a schematic block-diagram illustration of a system, in accordance with some demonstrative embodiments of the present invention.

The present invention provides novel cybersecurity identity authorization and fraud detection methods, as well as systems and devices for implementing or executing such methods. For example, the method of the present invention fuses or combines or aggregates biometric data and transaction information into a single data channel or a single data stream or a single data vector, in order to simultaneously (I) encode (or digitally represent, particularly using cryptographic methods such as encryption) the user identity and (II) validate the user's transaction information. The system and method of the present invention may be utilized in any suitable transaction context, such as, for example: transferring money or wiring funds to another person or entity in a banking application or "app" or website or web-based interface; transferring a cryptocurrency or paying via cryptocurrency; performing a wire transfer or an electronic funds transfer; performing an online purchase transaction or an electronic commerce (e-commerce) transaction at an online retailer or an online vendor; performing other type of online banking transaction or online brokerage transaction; performing other types of financial transactions or commercial transactions; or the like.

A demonstrative system in according to the present invention may include the following parties: (a) User who transacts; (b) Digital application on which the transaction UI or GUI exists or is displayed or is otherwise communication (e.g., a web application, a website, a web-page, a web-friendly application, a stand-alone or native application or "app", a downloadable application, an application that runs within a web browser); and (c) an external (e.g., remote) server for secure processing.

In some embodiments, in addition to directly authenticating users and transactions, the system may pose a requirement for the user (who attempts to initiate a transaction) to be recorded (e.g., to have his video and/or audio be recorded or captured or acquired); and this requirement by itself may dissuade or prevent at least some malicious users or attackers from performing a fraudulent transaction, as they do not want to provide their true identities and do not wish to have their image or audio recorded or captured or acquired; and this by itself may reduce fraud, and/or may homogenize attack vectors.

The Applicants have realized that at the core of a typical digital transactional system lies a fundamental separation between (I) "authentication" of a user, and (II) "verification" of a particular transaction that the user performs. For example, realized the Applicants, in a conventional banking website or application, a user is authenticated with their username and password; and then, at a later time-point and as a separate step, their particular transaction is verified. The Applicants have realized that this gap between authentication and verification may often be exploited by attackers, yet conventional cybersecurity systems continue to accept this axiomatic distinction and this gap. For example, realized the Applicants, stronger password protection only concentrates on user authentication, whereas advanced encryption of data only concentrates on transaction verification. The Applicants have realized that even advanced AI-based cybersecurity systems accept this distinction and this gap.

The system and method of the present invention unify authentication and verification into a single paradigm or into a single unified process or step or into a gap-less process. Specifically, the system of the present invention authenticates the user through biometrics, and then decodes the transaction from the biometric representation itself. Therefore, in accordance with embodiments of the present invention, it would be virtually impossible to forge or to fake a user's identity without also corrupting the transaction itself at the same time, and it would be virtually impossible to manipulate the digital representation of the transaction without simultaneously nullifying or affecting the biometric data that represents and authenticates the user's identity. The present invention thus provides a significantly more robust version of security and cybersecurity.

In some embodiments, the system and method of the present invention create a unified channel or a unified stream of data, which combines or fuses or encodes therein: digital data entered by the user (e.g., monetary amount to be transferred; recipient or beneficiary name and account number), and digital video data captured by the camera of the end-user device (e.g., one or more selected frames from a video that is recorded while the user is performing the transaction). Optionally, the video data reflects real-life or physical or "analog" events or phenomena that may have occurred during the recording of the video, which may be used for transaction verification purposes.

In some embodiments, optionally, the data that is encode into one or more video frame(s) may include one or more digital data-items that relate to the transaction being entered and/or submitted, including (but not limited to) data representing or indicating one or more digital background events that cause or that yield the transaction details; for example, in addition to encoding digital data representing "$625" as a wire transfer amount, the encoded data may further include a representation of one or more underlying JavaScript events that were triggered by keypresses of the user entering such data, or data indicating on-screen gestures and on-screen interactions of the user typing or entering such data via a touch-screen, and/or other digital background events or digital underlying events which the system may sense and collect and may then selectively encode into one or more video frame(s), as described herein.

In some embodiments, the transaction data is encoded into one or more of the video frames. In some embodiments, the system injects or generates or creates one or more real-world phenomena or events that cause, directly or indirectly, an effect on the video being recorded, and the system then verifies (e.g., at a remote server, and/or in the end-user device) that the recorded video indeed reflects such injected phenomena or such inserted events. For example, the end-user device may vibrate in accordance with a particular pattern while the video is being recorded or captured; and the captured video may then be analyzed to verify that its content indeed reflects that pattern of vibrations; accordingly, an "analog" or real-world event, or its real-life effect or result or interference or interfering event, is injected or added or inserted indirectly into the digital video recording or is augmenting the content of the video recording, in order to assist in verification and/or authentication. Similarly, the end-user device may generate one or more audio sounds or particular beeps or particular noises, or may emit pre-defined sounds or utterances, while the video and audio are being recorded; and the captured video and audio may then be analyzed to verify that their content indeed reflects the generated audio.

In another example, the end-user device may be configured by the system to generate selectively-modulated illumination or illumination-patterns or illumination-bursts, via a "flash" illumination unit of the end-user device (e.g., particularly a tablet or a smartphone equipped with a camera coupled to an illumination unit), or to otherwise cause on-screen projection or in-screen projection of one or more illumination patterns or colors; and concurrently, a video is being captured by a camera of the end-user device, and the captured video may then be analyzed to determine whether its content indeed shows an illumination pattern or an illumination signature that matches the illuminated pattern that is known to the system. For example, an illumination unit or a "flash" illumination unit of the end-user device, may be commanded to illuminate in accordance with a pre-defined illumination pattern, such as, "1-0-1-1-0-1-0-0-1-1-1", wherein "0" indicates non-illumination for one second, and wherein "1" indicates illumination for one second; and the content of the captured video may be analyzed to determine whether it reflects such precise changes in illumination, in accordance with such timing and sequence. In another example, the screen of the end-user device may be configured by the system to change its background color, or to have a flashing border or margin, in accordance with such pattern; and the content of the captured video may be analyzed to determine whether it reflects such precise changes in illumination, in accordance with such timing and sequence.

Some embodiments of the present invention may thus operate to detect or prevent or eliminate or mitigate fraudulent transactions or fraud attempts, that are performed or attempted by a human attacker or impostor, or by an automated malware or trojan or malicious program or malicious script. Some embodiments may generate an alert notification or a warning message upon such detection of fraud or possible fraud; and may send or transmit such notification to a human auditor, to a fraud handling department, to a cyber-security team, to a system administrator, to an automated malware protection unit or malware removal unit, or to other entities. Some embodiments may automatically trigger or perform, automatically and/or autonomously, one or more fraud mitigation operations upon such detection; for example, by placing a hold or a freeze or a blocking command on a transaction or an account, or by requiring the user to perform re-authentication or multiple-factor authentication, or by requiring the user to re-try the transaction or to re-enter one or more of the transaction details, or by requiring the user to contact a customer service representative by phone or in person, or the like.

The following is a demonstrative method, in accordance with some embodiments of the present invention.

In a first step of the method, a biometric representation of the user is created and stored. This may be achieved through active or passive registration.

For example, the biometric representation of a user may be created or generated actively via an Active Registration Unit, by recording audio and/or video of the user or a single image or the user or a set of several images of the user (e.g., via a camera and/or a microphone) and optionally, in some implementations, also requesting that the user performs a pre-defined behavioral gesture or task (e.g., in some implementations, requiring the user to move his face in a particular pattern) to facilitate the information that is required for establishing a full biometric representation. In some embodiments, this implementation may require that the user would have been validated previously as the true (genuine, legitimate) user, such as via a password or via two-factor or multi-factor authentication, to ensure that the biometric representation is correct.

Alternatively, in some implementations, the biometric representation of the user may be created or generated passively, via a Passive Registration Unit, in a manner that is transparent to the user, by recording the user interacting with the interface (e.g., as discussed below) during one or more usage sessions. Optionally, these usage sessions can then be validated through a third party or by an external mechanism, and the recordings can be used to passively create a biometric representation of the user. As an example of such external validation, the transaction may be a wire transfer of User Adam; the banking system may detect that User Adam routinely performs a wire transfer of $2,400 on the first day of every calendar month towards User Bob; the banking system detects that after several such regular or repeated transfers, there are no complaints or allegations of fraud or other objections from User Adam (e.g., in response to emails and text messages that notify User Adam that an outgoing wire transfer was commanded in his bank account); and thus, the banking system is confident that these wire transfers are valid and legitimate and are non-fraudulent. Accordingly, the system of the present invention may be configured to passively "watch" or monitor several such transactions of User Adam, and to wait for an indication from the banking system that these transactions are legitimate and non-fraudulent; and a user profile for User Adam may then be constructed, retroactively, based on the behavior of the user as recorded and/or monitored during those legitimate transactions.

In some embodiments, once the biometric representation has been created or generated, via passive user registration or by active user registration or by a hybrid process of active and passive user registration, the raw images and video need not be stored, or may be deleted or discarded, thereby ensuring or increasing privacy for the user.

In a second step of the method, when the user opens or launches or accesses the application or website or web-page in order to perform or submit a transaction of any kind, a webcam or camera or imager (and optionally also a microphone) on the user's electronic device (e.g., smartphone, tablet, laptop computer) is enabled or activated or turned on, and automatically begins recording and capturing the field-of-view, thereby recording or capturing a video (and optionally also audio; or, in some embodiments, by capturing one or more images of the user at particular time-points that are defined as important and relevant from the point of view of authenticating the user and verifying the transaction) of the user's face and/or facial expression and/or head and/or behavior and/or gestures and/or pose and other user-related images or video or sound; in some implementations, capturing of a video, or of one or more images, of the user's face or face-area or head or head-area (e.g., from the shoulders up, or from the neck up, or from the chin up) may suffice. In some embodiments, this ongoing video recording may be shown in real-time to the user on the screen of his electronic device, along with (or within) the application itself. For example, this video that is being recorded or captured, may be shown to the user in the background of the application, with the application material overlaying; or it may be shown as a separate element or component on the screen; or as an internal window or tab; or as a picture-in-picture playback; or using other suitable on-screen location and styling methods. In some embodiments, the video continues recording and the video (and/or audio) continue to be captured by the electronic device, until the user completes a pre-specified or pre-defined action or set of operations, such as, until the user finalizes a set of actions for commanding to send out a transfer of funds, or until the user finished clicking or tapping on a final "submit transaction" button or link or GUI element. In some embodiments, the recording or acquisition of video and/or audio may optionally continue for a short period of time (e.g., 1 or 2 or 3 more seconds) beyond the final act performed by the end-user; in order to capture a small amount of post-transaction or post-submission events, as it may sometimes take the end-user device a short period of time to completely stop an intervening event or an injected event or a fixed action pattern that was initiated during the transaction submission process; for example, a five-seconds Vibration Pattern that was introduced into the transaction submission process, may terminate slightly after the quick user has already tapped his "submit transaction" button or link, and thus some implementations may optionally capture or record a few additional seconds of video and/or audio even after the transaction was submitted.

In a third step of the method, when the user opens or launches or accesses the application or website, an external (remote) server sends to the user's electronic device a unique digital key or digital token or other digital data-item or digital verification item for that transaction. Optionally, through a random or pseudo-random process, this unique digital key, combined with timestamps and other information about the electronic device and the application (e.g., the MAC address of the electronic device; its current Internet Protocol (IP) address; an exact version and build number of the Operating System and/or of the relevant application; the local time as reported by the electronic device; the time zone as reported by the electronic device; or the like), may then be utilized to uniquely determine the random processes and encodings used throughout this technique. For example, a first end-user device of User Adam, who attempts to performs a wire transfer operation via his iPhone, may be assigned or allocated a first process for unified user authentication and transaction verification; whereas, a second end-user device of User Bob, who attempts to perform a wire transfer operation via his Samsung Galaxy smartphone, may be assigned or allocated a second, different, process for unified user authentication and transaction verification; each process being determined in a selection process or in a construction process that takes into account, for example, the unique digital key of each session or transaction, and other user-specific or device-specific parameters or characteristics.

In step four of the method, one or more images or frames of the captured video are encoded with (or augmented with) information about the user's interaction with the application or with the end-user device. These can be encoded in one or more ways, as discussed above and/or herein. Images or frames from the video are sent, periodically or from time to time, or continuously or substantially continuously, to the external (remote) server for processing.

In step five of the method, when requested by the application, the external (remote) server performs the following: (a) It authenticates the user's identity, by matching the biometric profile to the images or frames from the application-recorded video; and also, substantially simultaneously, (b) it validates or verifies the transaction details by decoding the information that was encoded into the recorded images or frames; and also, substantially simultaneously, (c) it verifies the liveliness of the user and/or the freshness of the transaction (e.g., protecting from a replay attack; or protecting from a spoofing attack, in which an attacker utilizes an image or a mask or a deep-fake image or a deep-fake video of the legitimate user). The authentication information is then securely returned or sent to or transferred to the application and/or to the relevant application server (e.g., in an implementation where Server 1 performs or handles the authentication and verification, and Server 2 performs or handles the actual transaction) and/or to the relevant server that is responsible with actually performing the user-submitted transaction (e.g., the banking server of the bank, or a cloud-computing server of the bank which runs the server-side banking application).

In some embodiments, for users who do not yet have a biometric profile created for them, the system may still provide authentication, as described further herein in relation to "First Time Users".

In accordance with some embodiments, the processing power, the bandwidth, and/or the memory resources (or other resources) of the electronic device of the end-user, which may be required for locally executing the application and for performing the client-side operations, may be independent of the length of the session or of the type of the transaction. For example, instead of capturing-and-sending, or streaming, an entire video of the session (or, a video of a segment or a time-slot of the session) to an external remote server, the system instead may operate to selectively capture image snapshot(s) or screen grabs or selected frames at discrete moments in time or at pre-defined time intervals or time-points (e.g., every second) or at pseudo-random time intervals or time-points (e.g., at time intervals that are selected randomly from the range of 0.5 seconds to 0.9 seconds), or at particular time-points during the transaction or during the transaction entry process or during the transaction submission process that are defined or pre-defined as "strategic" or as "important and relevant" from the point-of-view of authenticating the user and/or verifying the transaction (e.g., as non-limiting examples, at a time-point in which the user types in a beneficiary name for a wire transfer; at a time-point in which the user enters a bank account number of a recipient of a wire transfer; wherein each type of transaction may be associated with a pre-defined set of such time-points that are defined as strategic or important for this type of transaction); and then sends to the remote server only those images or frames, or even their partial and/or encoded representation. The events triggering these snapshots, or the conditions that cause the selective grabbing or capturing or isolating of particular video frames for transmission to the remote server, may vary from session to session or from user to user or from device to device (e.g., may vary across two different usage sessions of the same user, such as on two different days), or may vary from application to application (e.g., may vary from the application used by Bank A, to the application used by Bank B). In some embodiments, they may typically include video frames or video segments or video portions that correspond, at least, to any time-window in which the user has actively interacted with his electronic device, and/or any time in which the user types on the device or taps or clicks or scrolls the screen, and/or any time in which the user interacted via touch gestures with a touch-screen of the electronic device, and/or any time in which the user interacted with one or more GUI elements or with a touch-pad or touch-screen or mouse or keyboard or on-screen keyboard, and/or any time in which the user entered data into the application (e.g., entered or typed or pasted any username or password or other credentials, or monetary amount, or beneficiary details), and/or any time that the application itself was closed or started or launched or otherwise interacted with, and/or one or more routine images or video frames that are captured and sent on a regular basis, such as, at pre-defined time intervals (e.g., once per two seconds), or at random or semi-random time intervals (e.g., at a random time interval that changes randomly in the range of 4 to 6 seconds). In some embodiments, a video is captured and stored locally on the end-user device during the entry of the data of the transaction by the user; and then, optionally, the video is encoded or re-encoded or augmented to further encode therein one or more transaction-related data; and then, the captured video is uploaded or is transmitted from the end-user device to the remote server, which in turn processes the video and analyzes its content to determine whether the content reflects one or more modulations or events that were introduced to (or by, or at) the end-user device during the capturing of the video. In other embodiments, a live video feed is acquired and uploaded in real time, as a live streaming video, from the end-user device to the remote server, during the data-entry of the transaction; and the remote server analyzes the content of the streamed video feed to determine whether it reflects one or more modulations or events that were introduced to (or by, or at) the end-user device during the capturing of the video. In other embodiments, the video may be streamed or uploaded in real time from the end-user device to the remote server, and also, the video may be captured locally or saved locally from the end-user device to the remote server after the transaction has already be submitted; and both the real-time streamed video, and the recorded and uploaded video, may be analyzed at the remote server, for double confirmation or dual confirmation; and this mechanism may be useful, for example, in a situation where the end-user device has a low-bandwidth Internet connection during the submission of the transaction, which may or may not suffice for streaming high-quality video to the remote server in real time, and thus the post-transaction video uploading may be uploaded (e.g., a few seconds or minutes or even hours) after the transaction was submitted, for further processing; and optionally, the transaction processing server may put a temporary "hold" or "freeze" on the submitted transaction until it receives the uploaded video and processes it. In other embodiments, the streaming of real-time video and/or the uploading of recorded video, may be implemented as streaming and/or uploading of one or more selected frames or images, and/or as streaming and/or uploading of one or more selected video-segments or time-slots, and/or as streaming and/or uploading of one or more selected audio portions. In some embodiments, the processing of the video may be performed exclusively at the remote server; or, may be performed exclusively locally at the end-user device; or, may be performed partially at the remote server and partially at the end-user device; or, may be performed in parallel by both the remote server and the end-user device. Other suitable mechanisms may be used.

Some embodiments may utilize one or more suitable means of combining or fusing or merging together: (i) the user generated input (e.g., the transaction data that the user entered via his electronic device), and (ii) the user biometric information (e.g., as captured by the camera and/or microphone of the electronic device and/or by other sensors of the electronic device), into a single unified channel or a single or unified data-item or datagram or message or data-stream or information vector, which represents concurrently both of those items. In some embodiments, the system may be agnostic to the means by which the user information and/or biometrics are integrated into the unified representation; and/or the system may simultaneously use two or more of such techniques, for example, in order to increase security and/or reliability. As mentioned above, the single unified channel that is generated and utilized by the system may include, optionally, one or more digital data-items that relate to the transaction being entered and/or submitted, including (but not limited to) data representing or indicating one or more digital background events that cause or that yield the transaction details; for example, in addition to encoding digital data representing "$625" as a wire transfer amount, the encoded data may further include a representation of one or more underlying JavaScript events that were triggered by keypresses of the user entering such data, or data indicating on-screen gestures and on-screen interactions of the user typing or entering such data via a touch-screen, and/or other digital background events or digital underlying events which the system may sense and collect and may then selectively encode into one or more video frame(s), as described. Some of the techniques which may be used, may be device specific and/or application specific, and/or may depend on the particular electronic device being used and/or on the particular application or implementation.

In some embodiments, optionally, the system may perform encoding of every keystroke that a user performs (or, every Nth keystroke), into one or more corresponding (or non-corresponding) frames of the video that is captured; such as, via secure watermarks, or by hidden watermarks, or by embedding suitable watermark(s) into selected video frame(s) and/or into all or most of the video frame(s) that are captured and/or that are transmitted to the remote server. Some embodiments may utilize steganography techniques in order to store and conceal data (e.g., keystrokes, device-specific data, user-specific data) into images or frames or video or audio. In some embodiments, when user Adam enters his name "Adam" through a physical keyboard or an on-screen keyboard, a digital encoding or representation of the letter "A" is added to Frame Number P of a video being captured while he types; then, a digital encoding or representation of "d" is added to Frame Number P+4 of the video being captured while he types; and so forth, thereby encoding a digital representation of each keystroke into a separate frame of the captured video. In some embodiments, Use Adam may type the letter "A" when the camera is capturing Frame number F, and the actual encoding of the representation of the letter "A" may be performed into a subsequent frame, such as Frame number F+3, as it may take a slight time period to generate the encoded data and/or to add it. In some embodiments, "keystrokes" may include incorrect data or typographical errors typed by the user; such as, adding a digital encoding or representation of a "backspace" or a "delete" keystroke or a CTRL or Shift key-press, or the like. Later, a remote server may reject the transaction or block it, based on the existence or based on the lacking of a particular keystroke, from the data encoded into frame(s) of the video; and/or based on the timing of such data. For example, a transaction may be blocked or rejected if the data submitted by the transaction form indicates that the user name is "Janet", while the keystroke data that was encoded into the relevant particular frames of the video indicates that the submitting user has actually typed the letters for "Emily" (five characters, but different characters) or for "Jane" (different number of characters, even though the first four characters are the same).

In some embodiments, optionally, for touch sensitive screens or touch-screens, encoding the spatial or geographical location of the electronic device of the user (e.g., obtained via GPS, or via Wi-Fi based location detection, or via other suitable location finding techniques, or based on data sensed by spatial orientation sensor(s) of the device), and/or the size or other properties of the interaction of the user with the electronic device (e.g., the size of the finger-print of the user on the touch-screen in a particular interaction), and/or the time duration or time-length of each time the user interacts with the touch screen (e.g., presses, types on, swipes, clicks, taps, scrolls, or the like); wherein such information is inserted or injected or encoded into one or more frames of the video that is or was captured. For example, User Bob clicks on a drop-down menu of "select payee" via his touch-screen; the electronic device senses that (i) the size of the fingerprint is approximately a circle having a diameter of 84 on-screen pixels, and that (ii) the touch duration for this on-screen touch operation was 0.70 seconds; and these two items of information, such as D=84 and T=0.70, may be encoded or digitally added into one frame or into several frames of the video that was captured during the transaction entry process.

In some embodiments, optionally, for end-user devices having one or more accelerometers, such as some smartphones or tablets or smart-watches, the system may perform and utilize encoding the accelerometer data (e.g., the data sensed or measured by the accelerometer(s) of the electronic device) into one or more frames of the video captured during the data entry process. In some embodiments, only selected or some images or frames from the video are sent (e.g., every so often, or at pre-defined time-intervals, or at random time-intervals, or when one or more conditions hold true). In some embodiments, the end-user device may optionally aggregate and then encode in a video frame (or in some video frames) some or all of the accelerometer data that occurred or that was sensed or measured, from the last video frame that was actually sent to the remote server, until the current frame that is about to be sent to the remote server, into the current frame that is about to be sent to the remote server; such that the currently-sent frame may include, encoded therein, a digital representation of accelerometer data that spans a time-period of several seconds, in some situations.

In some embodiments, optionally, based on a random digital key or based on other random or pseudo-random parameter or criteria, the system may utilize and/or encode, for example, a match (or a mismatch) between: (i) one or more selected user inputs (e.g., specific numbers or digits or characters that the user types), and (ii) one or more direct modulations of the camera of the electronic device, such as, changing the zoom (zoom in, zoom out), changing the lens focus, rotating the screen (or rotating the entirety of the electronic device), flashing the camera (e.g., causing the camera to light its flash or to activate its illumination unit) on and off (e.g., optionally in accordance with a particular pre-defined pattern), or the like. These changes and/or similar modifications may be initiated by the end-user device, and may be sustained (e.g., for several seconds) or may be temporary (e.g., may be performed one single time during the user interaction; or may be performed a particular number of times during the user interactions). These changes are encoded in the camera recording, and therefore they can be used by the system of the present invention to decode the original inputs that were actually made by the user. In a demonstrative example, user Carl is entering data into his smartphone to command a wire transfer; the process takes him 60 seconds; during this data entry process, a video is captured by the smartphone, at a frame capture rate of 30 FPS; at the 17th second of the process, the application causes the smartphone to activate its "flash" (its illumination unit) for exactly 1.5 seconds; this causes, or should cause, a set of 45 frames (or approximately 45 frames) to appear brighter or much brighter relative to the other frames, due to the illumination effect that was injected during the data entry process. The remote server may then verify or check, whether the particular frames of the video (or some of them) indeed reflect such injected event of added illumination, as a condition for approving or rejecting the submitted transaction.

In some embodiments, optionally, based on a random digital key or other random or pseudo-random parameter or criteria, some embodiments may utilize a match (or a mismatch) between: (i) one or more selected user inputs (e.g., specific numbers or digits or characters that the user types), and (ii) one or more indirect modulations of the camera of the end-user device; such as, vibrating or causing a vibration of the phone (or other end-user device that is utilized by the user), optionally in accordance with a particular vibration pattern, such that the recorded image or the recorded video is vibrated as well or reflects such induced spatial vibration. These changes are encoded in the camera recording, and therefore they can be used to decode the original inputs by the user. In a demonstrative example, user David is entering data into his smartphone to command a wire transfer; the process takes him 40 seconds; during this data entry process, a video is captured by the smartphone, at a frame capture rate of 30 FPS; at the 24th second of the process, the application causes the smartphone to activate its vibration unit for exactly two seconds; this causes, or should cause, a set of 60 frames (or approximately 60 frames) to appear fuzzy or out-of-focus, or to visibly show a displacement of objects or a displacement of the field-of-view by at least a few pixels (e.g., a head-shot of the user should be shown at a slight displacement of a few pixels to the right, then to the left, then to the right, and so forth, due to the vibration of the device and its camera). The remote server may then verify or check, whether the particular frames of the video (or some of them) indeed reflect such injected event of added vibrations, as a condition for approving or rejecting the submitted transaction.

In some embodiments, optionally, based on a random digital key or other random or pseudo-random parameter or criteria, the system may utilize a match (or a mismatch) between: (i) one or more selected user inputs (e.g., specific numbers or digits or characters that the user types), and (ii) the audio playing of one or more specific sounds or audio-clips or audible output or beeps or noises or other audio output from the speaker(s) of the electronic device of the user. The sound and video recordings can then be cross-referenced to ensure validity. In a demonstrative example, user Albert is entering data into his smartphone to command a wire transfer; the process takes him 45 seconds; during this data entry process, an audio-and-video clip is captured by the smartphone; at the 26th second of the process, the application causes the smartphone to generate a particular sound (e.g., a pre-recorded sound, a beep, an utterance a particular word or phrase, or the like) having a particular time-length (e.g., one second); this causes, or should cause, a one-second segment of the captured audio to include the pre-defined audio that was generated. The remote server may then verify or check, whether the particular portions of the captured audio (or, of the captured video-and-audio) indeed reflect such injected event of added background audio, as a condition for approving or rejecting the submitted transaction.

In some embodiments, optionally, the end-user device may be configured by the system to actively present to the user one or more requirements or challenges, such as, a requirement a to speak or to utter or to say specific part(s) of the transaction details while also recording a video of the user. This speech or audio stream is recorded by the end-user device. The sound and video recordings can then be cross referenced to ensure validity. In a demonstrative example, user Richard is entering data into his smartphone to command a wire transfer; the process takes him 50 seconds; during this data entry process, an audio-and-video clip is captured by the smartphone; at the 27th second of the process, the application causes the smartphone to display an on-screen message of "Please say now the word Passport", and/or to playback an audio clip that says "Please say now the word Passport"; wherein the particular word ("Passport") is selected randomly from a pool of pre-defined words or phrases; this on-screen message or audio message should cause user Richard to say the word "Passport" in the next few seconds that followed that message. The remote server may then verify or check, whether the particular portions of the captured audio (or, of the captured video-and-audio) indeed reflect such word(s) spoken by the user (optionally, utilizing a speech-to-text converter or an Automatic Speech Recognition (ASR) unit to convert the captured audio into a string of characters or into word(s) for matching purposes), as a condition for approving or rejecting the submitted transaction In some embodiments, optionally, the end-user device may record its own audio speaker(s) while they are playing specific parts of the user input details (e.g., the amount of money that the user requests to transfer), while also recording a video of the user. The speaker sounds or the audio output, optionally, can be uniquely modulated or modified or distorted in a particular manner, configured or programmed by the application or by the system, for each application or implementation, or even for each application session or usage-session or log-in session or transaction; for example, causing the end-user device to distort the audio playback in one manner for transaction 1 of user Adam; then, after one hour, distort the audio playback in a different manner for transaction 2 of user Adam, or for another transaction of user Bob). The sound and video recordings can then be cross-referenced to ensure validity. For example, the existence or the lack of a matching audio distortion in the captured audio (or, in the captured video-and-audio) may be used by the remote server to approve or reject the submitted transaction.

In some embodiments, optionally, the end-user device may present the application details or data or text or images or other content on the screen of the end-user device, in a unique way or in a modified way, and the camera of the end-user device may record a video of the user as he reads the content and/or interacts with it; and this may be used for transaction verification, or for rejecting or approving a submitted transaction. For example, user Carl is utilizing his tablet to enter data for a wire transfer, in a process that takes him 50 seconds; a video is being captured during this process via the front-side camera of the tablet; during this process, at the 18th second of the process, a content item (e.g., a text portion, or a GUI element) on the screen of the tablet is actively moved or displaced by the application, from the top part of the screen to the bottom of the screen and then again to the top of the screen, in an on-screen movement scheme that takes (for example) three seconds; one or more eye tracking techniques or image analysis or video analysis or computer vision techniques may be used (e.g., optionally utilizing Machine Learning (ML), or other suitable computer vision method) in order to follow and track the eyes of the user in the video recording, and to thereby verify that the user is directly engaging with the displayed material; for example, by detecting that the video captured by the end-user device, indeed depicts the face of a user in which the eyes of the user are shown gazing upwardly and then moving the gaze downwardly and then moving the gaze upwardly, in said example). For example, if the captured video does not show a change in the gazing direction of the user, or in the spatial face positioning of the user, from the 18th second of the video until the 21st second of the video, then the remote server may reject or block the transaction, since the captured video does not reflect the expected change(s) in its content that should have been triggered by the on-screen movement of the content-item or the GUI element during that time-period within the data entry process.

In some embodiments, optionally, the end-user device may present a physical challenge to the user, which may then be utilized for authentication or verification purposes; for example, requesting the user to raise his hand, or to make a V symbol with his fingers, or to do a "thumb up" or a "thumb down" gesture with his fingers. Such physical challenges or physical requirements or tasks may be triggered or initiated based on specific inputs of the user, or may be initiated randomly or pseudo-randomly, or if a particular type of transaction or transaction-data is entered (e.g., only for wire transfers, or only for wire transfers greater than 500 dollars to a new recipient). The manner in which the user performs the physical challenge is recorded by the camera of the end-user device which is recording the video of the user; and computer vision or image recognition methods may then be applied to the recorded video, to authenticate that the transaction was indeed authorized by the user, and/or to ensure liveness, and/or to block or detect a replay attack, or for other security-related purposes.

Some embodiments may optionally utilize augmented reality (AR) to generate and/or to present one or more virtual challenges or AR-based challenges to the user, which are then utilized for authentication or verification purposes. For example, the end-user device may require the user to touch a specific point in space; and such AR-based requirement or task may be triggered or initiated based on specific inputs of the user, or may be initiated randomly or pseudo-randomly, or if a particular type of transaction or transaction-data is entered. The manner in which the user performs the requested challenge is recorded by the camera (and/or by other sensors) of the end-user device, and image recognition or computer vision may then be applied to the video recording to authenticate that the transaction was indeed authorized by the user. In some embodiments, the AR-based task or challenge may be implemented using a dedicated AR-based device or unit (e.g., an AR-based helmet or glasses or head-gear or wearable device or other gear); however, in other embodiments, the AR-based task or challenge need not use any such additional or dedicated device, but rather, may be presented to the user via his regular end-user device (e.g., laptop computer, desktop computer, smartphone, tablet), such as by providing textual instructions and/or graphical instructions and/or audible instructions with regard to the required AR-based task, and then capturing and/or streaming video (e.g., recorded video that is captured locally and then uploaded, or a live video feed that is uploaded as a real-time streaming video) via the camera of the end-user device, as such camera can capture video which is then analyzed to determine whether it reflects user gestures that correspond to the AR-based task or challenge that was required from the user to perform.

Some embodiments may optionally use augmented reality (AR) to present the user with a means of inputting information to the application, through an augmented reality (AR) interface of other AR-based elements or components. For example, some embodiments may generate or present an AR-based keyboard or keypad or other AR-based input mechanism, which may be displayed in space and may allow the user to "type" or to tap virtually on such AR-based keyboard or input-unit, by performing spatial gestures in mid-air or on a planar object (e.g., a table), in order to enter information into the application. The challenge is recorded by the camera of the end-user device, and the video recording can then be used to authenticate that the transaction was indeed authorized by the user.

Some embodiments may operate to detect when a face (e.g., a human face) is present in the video frame that was captured by the camera of the end-user device, using image recognition or computer vision techniques. For example, if the face (e.g., any human face; or a particular human face of a particular human user) is not present (e.g., is not detected, or is not recognized) in one or more video frame(s) for a pre-defined period of time (e.g., for at least N seconds), then the end-user device may generate or provide to the user a warning (e.g., text-based warning, visual warning, audible warning) that the user should place his face within the field-of-view of the video that is being captured. This may enable the system to ensure that biometric information is available throughout the recorded session. In some embodiments, a lack of detection of a human face, for a pre-defined number of captured video frames (e.g., in at least M out of the N frames that were captured during the data entry process), and/or for a particular time-length (e.g., for at least T1 consecutive seconds; or for at least T2 non-consecutive seconds in the aggregate), may trigger the system to reject or block a submitted transaction.

In some embodiments, liveliness and/or freshness may be ensured or verified through one or more techniques that may be employed separately or in consort or in the aggregate. These techniques may include, for example, the following or other suitable methods.

In a first example for ensuring liveness and freshness, the end-user device may be configured to generate and display a box or a window or an on-screen content-item, inside or within the video frame, that moves around in accordance with a pattern defined by a random digital key or in accordance with a pre-defined movement pattern (e.g., which may optionally be selected randomly from a pool of multiple such pre-defined movement patterns). The user is thus required to keep his face inside the on-screen frame for a particular (e.g., substantial) period of time of the session or for at least a certain percentage of the session. This ensures that the user is actively engaged with the end-user device and with the application screen. Optionally, computer vision techniques or image recognition techniques may be used to ensure that the user's face indeed appears in the relevant video frame(s) that were captured, and/or that the eye gaze of the user is directed towards a relevant direction based on the movement that occurs to particular content item(s) on the screen; and such detected matches or mismatches may be used by the system to reject or approve a transaction.

In a second example for ensuring liveness and freshness, some embodiments may perform post-processing or real-time processing for screen detection, to ensure that a malicious actor or an attacker did not try to spoof the user's identify by maliciously utilizing a digital image or a digital video of the legitimate user that the attacker is playing or displaying on a computer screen or on a screen of other electronic device of the attacker. For example, a transaction is entered via a smartphone that is alleged to be the smartphone of user Adam that is operated by user Adam; the application requires the user to look into the front-side camera; a preliminary computer vision analysis of the video that was captured, shows that indeed there is a human face present in the captured video; a secondary analysis shows that the human face is indeed a match to a pre-stored image of the legitimate user (Adam), and that it appears to be live (e.g., the captured video shows a moving face of a human); however, a further computer vision analysis of the captured video, may reveal that the captured video also shows a thin black frame of an iPad or other tablet, surrounding the human face, thereby enabling the system to determine that this is actually an attacker or an impostor who had placed in front of the end-user device another electronic device (e.g., an iPad or another tablet) which plays a video of the face of the genuine user; and this may trigger the system to reject or block the submitted transaction.

In a third example for ensuring liveness and freshness, some embodiments may perform post-processing or real-time processing for paper detection, to ensure that a malicious actor or an attacker did not try to spoof the user's identify with a printed image of the user, such as, maliciously displaying to the end-user device a color printed image of the legitimate user. For example, a computer vision process may analyze the captured video, in order to specifically look for (and detect) paper imperfections, paper folds, paper wrinkles, paper shading, a two-dimensional or "flat" appearance of the image or face that is associated with a paper image and not with a three-dimensional head or object, or other paper revealing features that may thus be utilized for blocking or rejecting the submitted transaction.

In another example, some embodiments may perform post-processing or real-time processing for deep-fake detection, to ensure that a malicious actor or attacker did not try to spoof the user's identify by generating a deep fake video image of the user using generative machine learning technology. For example, a deep-fake detection unit may search for, and may detect, imperfect transitions between: (i) frame-portions that are attributed to a first source (e.g., a photo or a video of the genuine user), and (ii) frame-portions that were added or modified by an attacker who created a deep-fake image or video; based on imperfect or abrupt "stitch lines" between image portions, or non-smooth or non-gradual transitions between two neighboring image-portions or frame-regions; or other techniques for detecting a deep fake image or video, which may then trigger a determination to block or reject a submitted transaction.

In yet another example, some embodiments may perform or may introduce one or more real-time liveliness or freshness challenges, in order to demonstrate active or "live" or "fresh" or current engagement of a human user with the application, and/or in order to detect various types of replay attacks or other spoofing attacks. Such challenges or tasks may be or may include, for example, a generating or displaying a message requiring the end-user to perform a particular gesture with his face and/or head and/or hand(s) (e.g., "please look to your right, and then look to your left"; or "please raise your right hand and make the letter V with your fingers"; or "please move your head to look down towards the ground and then look back up towards the camera"; or other suitable tasks or challenges, which may be pre-defined in a pool or bank or database of such tasks or challenges; and which may be selected from such database randomly or pseudo-randomly, or based on task selection rules or challenge selection rules that take into account the type of transaction that is being submitted, the monetary amount involved, and/or other parameters or data).

For demonstrative purposes, some portions of the discussion above were in the context of performing or submitting a financial transaction or a banking transaction or a monetary transaction; however, these were only non-limiting examples, and embodiments of the present invention may be utilized in conjunction with a variety of other types of operations, transactions, and systems; and some embodiments may be agnostic to the type of transaction being performed or to the context of the transaction. For example, some embodiments of the present invention may be utilized for, or in conjunction with: performing a transaction in a securities account or a brokerage account; performing a transaction in crypto-currency or digital currency; composing and/or sending an electronic mail (email) message or other type of electronic or digital message in a manner that verifies the sender and/or the message; inputting and/or sending confidential information or confidential data; inputting and/or sending medical data, by a patient and/or by a physician and/or by a pharmacy and/or by a health practitioner or other entity; inputting and/or sending a medical prescription or a medical record by a physician or health practitioner; entering of data into an online form, or into a multi-part form or a multi-page form, or into a set of forms, or into a set of on-screen fields; modification of existing data (e.g., changing of account information or user information); entering or creating or adding a signature onto a form or a document (e.g., into or onto a PDF document); typing and/or sending of messages, Instant Messaging (IM) items or messages, chat messages, real-time messages, email messages, or other messages or interactions; inputting and/or sending a legal document or a legally-operative data-item or document (e.g., an attorney or a notary public submitting or sending a verified signature on an affidavit or a sworn statement); transmission of insurance-related information or data; authoring and/or transmission of data or a data-item that is intended to be entered into a blockchain data-set or a blockchain data structure; and/or various other types of data entry, data composing or authoring, data submission, data transmission, transmission of messages and/or data-items, and/or the processing of such data-items in a manner that requires to authenticate the sender and/or to verify the transaction or its data.

For demonstrative purposes, some portions of the discussion may refer to operations of user authentication and/or transaction verification as performed on (or by, or via) a remote server or an external server; however, these are only non-limiting examples; some, or all, of such operations may be performed, in some implementations, exclusively in or by the end-user device itself, or via a collaboration between the end-user device and the remote server, or via other suitable scheme that distributes the processing operations among two or more devices or units, which may be local and/or remote.

In some embodiments, video is recorded and captured by the end-user device, while the user is entering data and/or performing a transaction; and different implementations may determine differently whether, or how, to display to the end-user the video that is being captured. In a first implementation, the video feed that is being captured by an imager or a camera of the end-user device (e.g., by a front-side camera of a smartphone or a tablet), is also displayed or shown in real time on the screen of the end-user device, such as, as a small rectangle (e.g., occupying between 10 percent to 50 percent of the screen size) that is located at a corner of the screen. In a second implementation, the video feed that is captured is not shown at all to the end-user on the end-user device; and the system may operate entirely without ever showing to the end-user the actual or the real time video feed that was captured. In a third implementation, the video feed is shown to the user only for a partial period of time, such as, during the first three seconds of commencing to capture the video feed, in order to ensure that the end-user understands that he is being imaged, and then the on-screen display of the video feed is turned off or is removed or concealed (e.g., in order to allow the user to engage with the full on-screen UI or GUI). In a fourth implementation, the screen or the display unit of the end-user device, may show a modified version or a manipulated version or an altered version of the video feed that is actually being imaged and captured; for example, a cropped version which keeps only the imaged face of the user and crops-out most of the background behind him, or a blurred or partially-blurred version of the captured video feed (e.g., keeping the human face area non-blurred, while blurring some or all of the background image portions). In a fifth implementation, the screen or display unit of the end-users device, may show an animated avatar or a virtual representation of the user or of his face, or an animated cartoon representation thereof, or a personalized Emoji character (e.g., similar to Bitmoji characters or avatars), or the like; which may optionally be animated randomly, or which may optionally be animated in accordance with the actual video being captured and/or in accordance with the actual audio being captured (e.g., the video capture indicates that the user is yawning, and the on-screen avatar is animated to be yawning).

Some embodiments may optionally utilize a passive challenge to confirm (or detect, or estimate) liveness of the end-user; in which the liveness of the user is tested in a passive manner which is transparent and/or unknown to the user, wherein the user is not aware that the system is testing or estimating the liveness property. For example, the user is utilizing his electronic device to enter and submit transaction data; the front-side camera of the electronic device is operational, to capture the video of the user; a live feed of the acquired video is displayed in real time at a rectangular picture-in-picture on the screen of the electronic device; then, the application on the end-user device may intentionally cause a zoom-in, or a zoom-out, or other zoom-related modifications, or other shifting of moving or modifications or an expansion or a shrinkage of the field-of-view of the camera of the electronic device, thereby causing the face of the end-user to be partially (or even entirely) out of the modified or zoomed field-of-view of the camera, or thereby causing the face of the user to not appear (entirely, or at least partially) in the live video feed being captured and displayed in real time; the legitimate human user who actually operates the end-user device (e.g., and not a remote attacker or a malware, and not an attacker performing a spoofing attack via a paper image or via a digital image or via a digital video or via a deep-fake image or a deep-fake video of the legitimate user) is expected to notice that his face is not (entirely, or partially) within the displayed feed, and is expected to move or shift the position or location of his body or of his head or of the electronic device in order to adequately show his face within the captured video feed; thereby inducing the legitimate user to perform such real-world modifications that correct the on-screen anomaly, and thus enabling the system to determine liveness of the current end-user. In contrast, lack of corrective actions in response to such a challenge, may cause the system to estimate that the current user is an attacker or a malware that lacks liveness. Other types of challenges may be used for liveness detection or verification.

Some embodiments may perform on-device (or in-device) data fusion or data entanglement, for privatization purposes and/or for other purposes. For example, the system may collect biometric data and action signals (e.g., transaction data that is entered by the user via his electronic device), and then fuses or merges this data into a single unified channel of data on the end-user device itself; for example, by passing the data through a non-reversible entanglement transformation or fusion transformation or hash function or hashing formula. This results in entangled data or fused data, such that an attempt to attack or manipulate the biometric data therein, would fundamentally corrupt the action data or the transaction data, and vice versa. Furthermore, the data entanglement process may also eliminate any human-identifiable biometric signatures from the unified data that is utilized for user authentication and transaction verification.

Some embodiments may utilize one or more ways or units, in order to combine or fuse together biometric data with transaction data. In addition to, or instead of, the ways and the units described above, one or more of the following method(s), may be used: (a) Using the microphone of the end-user device to listen to (or to monitor) the ambient audio while the user is entering transaction data, thereby capturing and detecting audio that indicates the existence of keyboard clicking and/or finger(s) clicking and tapping sounds, thus ensuring that a physical input was indeed present based on the audio sounds that it emitted, and ensuring that physical taps and keystrokes have indeed triggered a digital response on the end-user device (e.g., in contrast with a malware or a remote attacker). (b) Monitoring and recording of mouse movements and clicks and gestures, and/or gestures or interactions with a touch-pad or other physical input unit or tactile input unit of the electronic device; and adding such monitored data into the unified data channel that represents both biometric data and transaction data. (c) Utilization of Augmented Reality (AR) methods, to request the end-user to perform a task or to enter a code or a secret that the user knows; for example, to perform a particular pre-defined hand motion or hand gesture that was set in advance for this user, or performing spatial touching of (or, spatial gesturing or pointing towards or at) particular AR-based elements that are projected or otherwise viewable via an AR environment or an AR device (e.g., AR helmet or gear or glasses or other equipment), or performing other AR-based task or challenge which requires the end-user to perform certain spatial gestures which are imaged by the camera(s) of his end-user device and their existence and correctness are analyzed and verified based on a captured video or from an uploaded streaming video. (d) Utilization of interactive means for verifying a transaction, by requiring the user to perform a particular gesture or spatial gesture (e.g., randomly or pseudo-randomly selected from a pool or a bank of pre-defined gestures), for example, requiring the user to move his face or to nod his head or to blink with his eyes or to move his hands or fingers, as a way of confirming liveness and/or in order to indicate the user's approval to confirm a transaction.

Embodiments of the present invention may thus operate to combine or merge or fuse together, (i) biometric data (or user interaction data) and (ii) transaction data or action data, into a unified data-item or a unified vector or channel of information; optionally utilizing or applying a privatization method or a fusion or hashing or data transformation method to facilitate this process. Embodiments of the present invention may both concurrently (i) authenticate the identity of the user, and (ii) validate or verify the submitted transaction, as (or using) a single unified verification step. Some embodiments may further provide continuous or substantially continuous authentication and verification of a transaction and the biometric data associated with it, throughout the course or the path of a transaction, and not just at an ending time-point at which the transaction data is submitted for processing.

Reference is made to FIG. 1, which is a schematic block-diagram illustration of a system 100, in accordance with some embodiments of the present invention. System 100 may be implemented using a suitable combination of hardware components and/or software components.

For example, an Electronic Device 110 may be utilized by an end-user in order to interact with a computerized service, typically implemented as via a remote Server 150 (e.g., a dedicated server, a "cloud computing" server, an application server, a Web server, or the like). Electronic Device 110 may be, for example, a laptop computer, a desktop computer, a smartphone, a tablet, a smart-watch, a smart television, or the like. Electronic Device 110 may communicate with Server 150 via one or more wired and/or wireless communication links and/or networks; for example, over the Internet, via an Internet connection, via an Internet Protocol (IP) connection, via a TCP/IP connection, via HTTP or HTTPS communication, via Wi-Fi communication, via cellular communication (e.g., via 5G or 4G LTE or 4G or 3G or 2G cellular communication), or the like.

Electronic Device 110 may comprise, for example: a processor 111 able to execute code; a memory unit 112 (e.g., Random Access Memory (RAM) unit, Flash memory, volatile memory) able to store data short-term; a storage unit 113 (e.g., Hard Disk Drive (HDD), Solid State Drive (SSD), optical drive, Flash memory, non-volatile memory) able to store data long-term; a display unit 114 (e.g., a touch screen, or non-touch screen, or other display unit or monitor); one or more input units 115 (e.g., keyboard, physical keyboard, on-screen keyboard, touch-pad, touch-screen); a microphone 116 able to capture audio; a camera 117 or imager(s) (e.g., front-side camera, front-facing camera, rear-side camera, rear-facing camera) able to capture video and/or images; and/or other suitable components. Electronic Device 110 may further include, for example, a power source (e.g., battery, power cell, rechargeable battery) able to provide electric power to other components of Electronic Device 110; an Operating System (OS) with drivers and applications or "apps"; optionally, one or more accelerometers, one or more gyroscopes, one or more compass units, one or more spatial orientation sensors; and/or other components.

Electronic Device 110 may comprise a Client-Side Application 131, which enables the end-user to perform or to submit or to request a transaction, typically being in communication over wired and/or wireless communication link(s) with Remote Server 150. For example, Remote Server 150 may comprise a Server-Side Application 155 (e.g., a server-side banking application or online commerce application), which may include or may be associated with a User Authentication Unit 151 and a Transaction Verification Unit 152; and in some embodiments, they may be implemented as a Unified User-and-Transaction Validation Unit 153 as it may concurrently authenticate the user and verify transaction at the same time and based on the same unified channel of data which fuses together biometric data and transaction data.

The Server-Side Application 155 may perform any of the functionalities that are discussed above and/or herein with regard to server-side operations, by itself and/or by being operably associated with one or more server-side components and/or by being operably associated with one or more client-side components (which may optionally perform some of the operations or functionalities described above and/or herein). Similarly, the Client-Side Application 131 may perform any of the functionalities that are discussed above and/or herein with regard to client-side operations, by itself and/or by being operably associated with one or more client-side components and/or by being operably associated with one or more server-side components (which may optionally perform some of the operations or functionalities described above and/or herein). It is noted that FIG. 1 shows, for demonstrative purposes, some components as being located on the server side, and shows some other components as being located on the client side; however, this is only a non-limiting example; some embodiments may implement on the client side one or more of the components that are shown as located on the server side; some embodiments may implement on the server side one or more of the components that are shown as located on the client side; some embodiments may implement a particular component, or some component, by utilizing both a server-side unit and a client-side unit; or by using other suitable architectures. In some embodiments, raw data and/or partially-processed data and/or fully-processed data, as well as sensed data and/or measured data and/or collected data and/or newly-generated data, may be exchanged (e.g., over a secure communication link) between client-side unit(s) and server-side unit(s), or between the end-user device and the remote server, or between or among components that are located on the same side of the communication channel.

Optionally, biometric representation of a user may be created or generated actively via the Active Registration Unit 121; or, biometric representation of the user may be created or generated passively via the Passive Registration Unit 122. A Mismatch/Anomaly Detector Unit 157 may operate to detect an anomaly or a mismatch or discrepancy or corrupted data or manipulated data, in the unified data channel that comprises transaction data and biometrics data. A Fraud Estimation/Detection Unit 158 may detect or estimate or determine that the transaction is fraudulent and/or that the user is not the genuine legitimate user or that the unified data channel has been corrupted or manipulated or tampered with, based on the mismatch or anomaly detected, and/or based on other parameters involved or conditions checked, e.g., taking into account the type of transaction that was requested, such as a retail purchase or a wire transfer; taking into account the monetary amount or the monetary value of the transaction; taking into account one or more risk factors or fraud-related indicators that are pre-defined or that are detected (e.g., the transaction is performed from a new computing device that was never used before by this user or by this account owner, or from a geographic location or from an Internet Protocol (IP) address that was never used before by this user or by this account owner, or the like).

Fraud Detection and Prevention Unit 158 may perform one or more operations of fraud detection or fraud estimation or fraud determination, based on the anomalies or discrepancy or fraud-related signals that the system may be able to produce or generate. If it is estimated or determined that a fraudulent transaction is submitted, optionally with a fraud certainty level that is greater than a pre-defined threshold value, then Fraud Mitigation Unit 159 may trigger or may perform one or more fraud mitigation operations or fraud reduction operations; for example, by blocking or rejecting or freezing the submitted transaction or the associated account, by requiring the user to perform additional authentication operations via additional authentication device(s) or route(s) (e.g., two-factor authentication), by requiring the user to contact a customer service representative by phone or in person, by requiring the user to answer security questions, or the like.

Some embodiments of the present invention may include methods and systems for user authentication and/or transaction verification, or for a single-step validation or unified validation of user-and-transaction, or for fraud detection and fraud mitigation. For example, a computerized method may include: (a) monitoring interactions of a user who interacts with an electronic device to enter transaction data, and extracting one or more biometric traits of the user; (b) generating a unified data-item, that represents a unified fusion of both (i) the transaction data, and (ii) biometric data reflecting the one or more biometric traits of the user that were extracted from interactions of the user during entry of transaction data. The monitoring of user interactions may be performed by a User Interactions Monitoring Unit 132, which may monitor and/or log and/or track and/or record user interactions that are performed by the user. Optionally, a Biometrics Sensor/Collector Unit 133 may operate to collect and/or to generate biometric data, based on data or readings or measurements that are sensed or measured by one or more input units of the end-user device and/or by one or more sensors of the end-user device. Transaction Data Collector Unit 134 operates to collect the transaction data that is being entered or submitted, or that was entered and/or submitted, by the user. Unified Transaction-and-Biometrics Data-Item Generator 135 operates to fuse together, or merge, or otherwise unify, the biometrics data and the transaction data, or to embed or conceal one of them into the other, or to otherwise generate entanglement of the transaction data with the biometrics data. The unified transaction-and-biometrics data-item (or record) may then be transferred or transmitted to the remote server, via a secure communication channel, and may be processed there by the Unified User-and-Transaction Validation Unit 153.

In some embodiments, the transaction data within the unified data-item that is generated in step (b), cannot be modified or corrupted without also causing modification or corruption of the biometric data within the unified data-item; and similarly, the biometric data within the unified data-item that is generated in step (b), cannot be modified or corrupted without also causing modification or corruption of the transaction data within the unified data-item;

In some embodiments, modification or corruption of the transaction data within the unified data-item, automatically causes modification or corruption of the biometric data within the unified data-item; and similarly, modification or corruption of the biometric data within the unified data-item, automatically causes modification or corruption of the biometric data within the unified data-item.

In some embodiments, the method comprises: (A) during entry of transaction data by said user via the electronic device, activating a video camera of said electronic device and capturing a video feed of said user; (B) embedding at least part of the transaction data as digital data that is added into and is concealed within one or more video frames of said video feed; (C) authenticating said user and the submitted transaction, based on said video feed that includes therein the transaction data concealed within one or more video frames thereof.

In some embodiments, selective activation and/or de-activation of the video camera, and/or of other components of the end-user device that are discussed above and/or herein (e.g., the illumination unit or the "flash" illumination unit; the vibration unit, or other tactile feedback unit; the microphone; or the like) may be performed by a Selective Activation & Deactivation Unit 136; and such selective activation or deactivation may optionally be performed based on one or more commands or signals or triggers, which may be generated locally in the end-user device (e.g., the client-side application 131 may trigger a selective activation of the front-facing video camera, since the user is requesting to commence data entry for a wire transfer to a new payee), and/or which may be received from the remote server (e.g., the remote server 150 may send a command to the end-user device, requiring to activate the front-facing video camera of the end-user device, since it detects that the end-user device is connected to the remote server via a new IP address that was not seen before for this user). Other criteria or conditions may be used.

In some embodiments, the embedding operations or the concealing operations may be performed locally within the end-user device via an Data Embedding/Concealment Unit 137, which may utilize one or more steganography techniques, encoding, cryptographic algorithms, data fusion algorithms, data hashing algorithms, or other suitable methods.

In some embodiments, the method comprises: (A) during entry of transaction data by said user via the electronic device, activating a video camera of said electronic device and capturing a video feed of said user; (B) during the capturing of the video feed of the user during entry of the transaction data, causing said electronic device to vibrate (e.g., by activating its vibration unit, or other tactile feedback unit) at a particular time-point and in accordance with a pre-defined vibration scheme; (C) performing an analysis of captured video that was captured by the camera of the electronic device during entry of data of said transaction, to detect whether or not a content of the captured video reflects said pre-defined vibration scheme at said particular time-point.

In some embodiments, for example, a Computer Vision Analysis Unit 188 may receive the video from the end-user device, over a secure communication channel; and may perform analysis of the video in order to determine whether the content of the video indeed reflects the vibration(s) at the relevant time-points or time-slots (e.g., a rapid displacement of the content of a frame, sideways or right-and-left or up-and-down, generally in accordance with the vibration pattern or the vibration scheme that was introduced on the end-user device).

In some embodiments, the method comprises: (A) during entry of transaction data by said user via the electronic device, activating a microphone of said electronic device and capturing an audio feed; (B) during a capture of audio during entry of the transaction data, causing said electronic device to emit a particular audible sound at a particular time-point; (C) performing an analysis of captured audio that was captured by the microphone of the electronic device during entry of data of said transaction, to detect whether or not a content of the captured audio reflects said particular audible sound at said particular time-point.

In some embodiments, for example, an Audio Analysis Unit 189 may receive the audio from the end-user device, over a secure communication channel; and may perform analysis of the audio in order to determine whether the content of the audio indeed reflects the particular audible sounds that were introduced by the end-user device at the relevant time-points.

In some embodiments, the method comprises: (A) during entry of transaction data by said user via the electronic device, activating a video camera of said electronic device and capturing a video feed of said user; (B) during the capturing of the video feed of the user during entry of the transaction data, causing at a particular time-point a particular displacement of an on-screen element within a screen of the electronic device, wherein said displacement of the on-screen element is intended to induce a particular change in a staring direction or a gazing direction of the user (e.g., by an On-Screen Element Displacement Unit 138, which may displace or move an on-screen element, or which may animate an on-screen element in a manner that is expected to attract attention or staring or gazing by the end-user; or which may add or modify visual attributes to an on-screen element, such as, by repeatedly changing its color or its brightness level or its size); and then (C) performing an analysis of captured video that was captured by the camera of the electronic device during entry of data of said transaction, to detect whether or not a content of the captured video reflects at said particular time-point said particular change in the staring direction or the gazing direction.

In some embodiments, the method comprises: (A) during entry of transaction data by said user via the electronic device, activating a video camera of said electronic device and capturing a video feed of said user; (B) during the capturing of the video feed of the user during entry of the transaction data, causing a zoom-related operation of the camera to change the field-of-view of the camera that is captured in said video field (e.g., performed by a Field-of-View Modification Unit 139), and thus causing a face of the user to be at least partially outside of the field-of-view of the camera; (C) performing an analysis of captured video that was captured by the camera of the electronic device during entry of data of said transaction, to detect whether or not a content of the captured video reflects a corrective physical action that said user performed to bring his face fully into the field-of-view of the camera of the electronic device.

In some embodiments, the method comprises: (A) during entry of transaction data by said user via the electronic device, activating a video camera of said electronic device and capturing a video feed of said user; (B) during the capturing of the video feed of the user during entry of the transaction data, generating a notification requiring the user to perform a particular spatial gesture with a particular body part of the user; (C) performing an analysis of captured video that was captured by the camera of the electronic device during entry of data of said transaction, to detect whether or not a content of the captured video reflects the particular spatial gesture of the particular body part. The client-side operations may be performed via a Spatial Gesture(s) Requestor Unit 141, which may select or generate the request to perform the particular spatial gesture. The server-side operations may be performed via the Computer Vision Analysis Unit 188, or by a Spatial Gesture Recognizer Unit 161 or other component(s).

In some embodiments, the method comprises: (A) during entry of transaction data by said user via the electronic device, activating an Augmented Reality (AR) component that is associated with the electronic device; (B) generating a notification requiring the user to perform a particular spatial gesture to interact with a particular AR-based element that is displayed to the user via said AR component; (C) performing an analysis of captured video that was captured by a camera of the electronic device during entry of data of said transaction, to detect whether or not a content of the captured video reflects said particular spatial gesture. The client-side operations may be performed via an AR-Based Requestor Unit 142, which may select or generate the request to perform the AR-based gesture(s) or task(s). The server-side operations may be performed via the Computer Vision Analysis Unit 188, or by an AR-Based Task Recognizer Unit 162 or other component(s).

In some embodiments, the method comprises: (A) during entry of transaction data by said user via the electronic device, activating a video camera of said electronic device and capturing a video feed of said user; (B) during the capturing of the video feed of the user during entry of the transaction data, causing an illumination unit of said electronic device to illuminate at a particular time-point and in accordance with a pre-defined illumination scheme; (C) performing an analysis of captured video that was captured by the camera of the electronic device during entry of data of said transaction, via the Computer Vision Analysis Unit 161, to detect whether or not a content of the captured video reflects said pre-defined illumination scheme at said particular time-point.

In some embodiments, the method comprises: (A) during entry of transaction data by said user via the electronic device, activating a microphone of said electronic device and capturing an audio feed; (B) performing an analysis of captured audio that was captured by the microphone of the electronic device during entry of data of said transaction, via the Audio Analysis Unit 189, to detect whether or not said captured audio reflects sounds of physical keystrokes and sounds of physical taps that match data entry of the transaction data that was submitted via said electronic device.

In some embodiments, step (b) that was mentioned above may comprise: embedding and concealing said transaction data, into one or more video frames of a video that is captured by the electronic device during entry of transaction data. This may be performed by the Data Embedding/Concealment Unit 137. The embedded data or the concealed data may then be extracted and processed on the server side for user authentication and transaction verification, by a Concealed Data Extractor & Analyzer Unit 163.

In some embodiments, step (b) that was mentioned above may comprise: generating the unified data-item by performing digital hashing, in accordance with a pre-defined digital hash function, of said transaction data and said biometric data; or by performing other suitable process of unidirectional privatization of the data, or a process of privatization transformation of the data, which passes the data through a one-way transformation that is non-reversible; wherein the original (pre-transformation) data cannot be reversed or obtained from the post-transformation data; wherein the post-transformation data is sufficient for the purposes of biometric analysis and/or user authentication and/or transaction verification.

In some embodiments, step (b) that was mentioned above may comprise: performing continuous real-time authentication of the user during entry of transaction data, and concurrently performing real-time verification of the transaction data; wherein said performing is a single step process of concurrent user authentication and transaction verification; wherein said single step process lacks a time-gap between user authentication at log-in and transaction verification at transaction submission.

In some embodiments, step (b) that was mentioned above may comprise: embedding and concealing, into one or more video frames of a video that is captured by the electronic device during entry of transaction data, at least one of: (I) a name of a recipient or a beneficiary of the transaction, (II) an address of a recipient or a beneficiary of the transaction, (III) a monetary amount of the transaction.

In some embodiments, the method comprises: (A) during entry of transaction data by said user via the electronic device, activating a video camera of said electronic device and capturing a video feed of said user, and also, activating a microphone of said electronic device and capturing an audio feed of said user; (B) during the capturing of the video feed and the audio feed, causing the electronic device to perform at a particular time-slot, at least one modulation that is selected from the group consisting of: (I) a visual modulation that affects video captured by the camera, (II) an audible modulation that affects audio captured by the microphone; (C) performing an analysis of captured video and captured audio, that were captured by the electronic device during entry of data of said transaction, to detect whether or not the captured video and the captured audio reflect, at said particular time-slot, said at least one modulation.

The particular modulation(s) that are performed may be selected locally in the end-user device 110; or may be selected remotely at the remote server 150 and then conveyed as signals indicating to the end-user device 110 which modulation(s) are required to be performed; or may be a combination or an aggregation of locally-selected modulations and remotely-commanded modulations. For example, a Modulations Client-Side Selector Unit 143 may select one or more modulations to apply, from a locally-stored Modulations Pool 144, based on one or more pre-defined triggers or conditions or criteria (e.g., the electronic device 110 detects that the user is commencing a process to perform a wire transfer to a new payee); and/or, a Modulations Server-Side Selector Unit 173 may select one or more modulations that the electronic device 110 should apply, from a remotely-stored Modulations Pool 174, based on one or more pre-defined triggers or conditions or criteria (e.g., the remote server detects that the electronic device is logged-in from an IP address or from a geo-location that was not associated in the past with this particular electronic device). In some embodiments, the particular modulation that is selected to be applied, or the particular set or group of modulations that is selected to be applied, may be selected by taking into account, for example, the type of the transaction being submitted or entered (e.g., selecting an illumination modulation for a wire transfer transaction, or selecting an audio modulation for an online retail purchase transaction), and/or based on the monetary amount involved in the transaction (e.g., selecting an illumination modulation for a wire transfer having a monetary amount that is greater than $750, or selecting an audio modulation for a wire transfer having a monetary amount that is equal to or smaller than $750), and/or based on the geographic region or the geo-location of the current end-user or of the recipient (e.g., if geo-location of the current user indicates that he is located within the United States then apply illumination modulation; if geo-location of the current user indicates that he is located within Russia then apply audio modulation), and/or based on the geographic region or the geo-location of the recipient or beneficiary (e.g., if the beneficiary address is within the United States then apply an illumination modulation; if the beneficiary address is within China then apply an audio modulation), and/or based on the current time-of-date or day-of week (e.g., avoiding an audio modulation if the local time at the end-user device is estimated to be 3 AM; or conversely, in some implementations, select an audio modulation during night-time at the end-user device), and/or based on other parameters or conditions. In some embodiments, two or more modulations may be selected and applied in series, within the same video capture or audio capture or image(s) capture process, and within the same single transaction that is being submitted or entered; for example, User Adam performs a wire transfer transaction which takes him 45 seconds; during the first quarter of the transaction, an illumination modulation is performed; during the third quarter of the same transaction, an audio modulation is performed; during the last quarter of the same transaction, a device vibration modulation is performed. In some embodiments, two or more modulations may be selected and applied in parallel or concurrently or simultaneously, or in two time-slots that are at least partially overlapping with each other, within the same video capture or audio capture or image(s) capture process, and within the same single transaction that is being submitted or entered; for example, User Bob performs a wire transfer transaction which takes him 60 seconds; during the second quarter of the transaction, an illumination modulation is performed for 3 seconds, and in parallel, a device vibration modulation is performed for 2 seconds. In some embodiments, the modulation(s) are selected exclusively on the client side, on the end-user device; in other embodiments, the modulation(s) are selected exclusively on the server side, such as, on the server that runs the application that processes the transaction (e.g., a server-side banking application that runs on a server of a bank; a server-side securities trading application that runs on a server of a securities trading firm; an e-commerce server-side application that runs on a server of an online merchant; a trusted server or a fraud-detection server that is run or administered by a trusted third-party that provides security-related services to banks or retailers or other entities); in still other embodiments, the modulation(s) are selected by cooperation between the client-side device and the remote server; in yet other embodiments, one or more modulations are selected locally by the end-user device, and one or more additional modulations are selected remotely by the remote server. Other suitable modulation schemes may be used.

Although portions of the discussion herein relate, for demonstrative purposes, to wired links and/or wired communications, some embodiments are not limited in this regard, but rather, may utilize wired communication and/or wireless communication; may include one or more wired and/or wireless links; may utilize one or more components of wired communication and/or wireless communication; and/or may utilize one or more methods or protocols or standards of wireless communication.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C#, Java, JavaScript, SQL, Ruby on Rails, Go, Cobol, Fortran, ActionScript, AJAX, XML, JSON, Lisp, Eiffel, Verilog, Hardware Description Language (HDL), BASIC, Visual BASIC, MATLAB, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Furthermore, repeated use of the phrase "in one embodiment" does not necessarily refer to the same embodiment, although it may. Similarly, repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some embodiments may be used in, or in conjunction with, various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a tablet, an on-board device, an off-board device, a hybrid device, a vehicular device, a non-vehicular device, a mobile or portable device, a consumer device, a non-mobile or non-portable device, an appliance, a wireless communication station, a wireless communication device, a wireless Access Point (AP), a wired or wireless router or gateway or switch or hub, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), or the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA or handheld device which incorporates wireless communication capabilities, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may comprise, or may be implemented by using, an "app" or application which may be downloaded or obtained from an "app store" or "applications store", for free or for a fee, or which may be pre-installed on a computing device or electronic device, or which may be otherwise transported to and/or installed on such computing device or electronic device.

Some embodiments provide systems and computerized methods for securely entering, submitting, transmitting, receiving, processing, and authentication a transaction or a message; such as a banking transaction, a brokerage/securities transaction, a financial transaction, a wire transfer transaction, an online payment transaction, a crypto-currency sell/buy/exchange/pay/transfer/stake transaction, an NFT sell/buy/transfer transaction, a virtual asset sell/buy/exchange/stake/transfer transaction, an online e-commerce retail transaction, an online purchase transaction, an online/electronic transaction performed using a credit card or debit card or other payment method or payment means (e.g., via a PayPal account or payment mechanism, or by a Zelle or Venmo or "Cash App" payment mechanism or similar money-transfer mechanisms), or other types of transactions.

The Applicant has realized that in a rapidly changing digital environment where security threats evolve every day, banks and merchants and financial institutions should take extra precautions to protect their customers and the sensitive data they handle. Malicious attacks such as phishing, adversary-in-the-middle, session hijacking, and malware or trojans pose an ever-present risk that banks and other entities have to navigate and mitigate. This results in more fraud detection systems, more signals, more management tools, larger and cumbersome and complex operations, and overall higher costs as well as human resources and computing resources; while also adding frustrating friction to the user experience without actually solving the fraud problem.

Some embodiments provide innovative systems and methods, which may be called Authentic-Action or AuthenticAction, to protect customers and safeguard users them against fraud during all of their digital transactions, while keeping their experience efficient and secure. Through a combination of continuous biometric authentication combined with session monitoring and automatic data sealing, the AuthenticAction platform ensures that only the authorized (legitimate) user can execute or submit transactions and sensitive actions. This means faster, easier, more secure transactions for the bank's (or other merchant) customers, as well as lower fraud rates.

In some embodiments, the system can be used in conjunction with a variety of applications, for example, banking, mobile banking, wealth management, securities trading, brokerage, electronic payment, credit card/debit card payment or processing, online purchases, e-commerce applications or websites, online merchant websites or apps, money transfers, funds transfers, transfer of crypto-currency or virtual assets or crypto-coins or crypto-tokens or NFTs, submitting of applications or requests to issue a new credit card or to obtain a loan or a mortgage, or other transactions or requests that are submitted or conveyed via electronic or digital channels or electronic devices.

Some embodiments may provide one or more of the following benefits or advantages: (1) True Fraud Prevention, and removal or mitigation of the risk of account takeover and session compromise fraud; the system ensures that only authenticated users are able to complete transactions. (2) Deliver a Reimagined, Frictionless user experience; (3) Reduce Fraud Investigation Efforts; by improving security measures, the financial institution or merchant can reduce the amount of fraud claims that require lengthy investigation cycles; (4) Seamless Integration and Deployment; using API calls to the AuthenticAction service which improve and enable new digital user flows, reducing integration complexity while improving user security and experience. (5) The system may remove or reduce the need for utilizing passwords, two-factor or multi-factor authentication, and other security measures, leaving customers with a convenient and streamlined experience. (6) Improve Operational Efficiency; remove dependency on fraud signals that are operationally complex and expensive to manage.

Some embodiments may replace a cumbersome process for an online transaction, that includes: log-in authentication, then log-in challenge and response, then submission of the transaction (or other "sensitive action" or "increased-security action"), then a particular challenge and response for the sensitive transaction, then automated and manual transaction analysis by fraud detection mechanisms and/or human analysists; replacing this cumbersome process with an efficient process, which can even be password-less or factor-less, which includes a biometric log-in, then continuous authentication of the user and the transaction during the transaction entry and submission, and then transaction and user verification using a unique binding or "seal" that binds together the transaction data with the biometric data and optionally also server-generated data (from a trusted server) that cannot be faked or reproduced or replaced or injected by a human attacker or by an automated attacker; wherein the binding "seal" enables the protected entity (the bank, the online merchant, the credit card processing company, or the like) to ensure that (i) the user who submitted the transaction data is indeed the legitimate and authorized user (and not a human attacker, and not an automated attacker or malware or malicious script), and that (ii) the transaction data that was received at the server of the protected entity is indeed the original and legitimate data that the authorized and legitimate user has manually entered (and not replacement data or augmented data or modified data that was provided or replaced or added or injected by a human attacker or by an automated attacker or malware or malicious script). These benefits may be achieved by still maintaining an efficient and friction-less/friction-free interface and user experience, without using a challenge-response mechanism or while reducing the number of times in which a challenge-response is utilized, without adding new friction or new burdens on the user, without requiring heavy modifications of the computerized systems or code of the protected entity for integration and deployment; and while providing to the protected entity, such as via a single API request or two API requests, an efficient, short, binary response (yes/no, or true/false) with regard to (i) is this the same, legitimate, authorized user, and (ii) is the transaction data authentic and having integrity (rather than compromised/replaced/fake/malicious/attacker-generated transaction data).

In some embodiments, the system performs three primary functions during the regular interaction of the user as he enters transaction details.

First step: the system ensures the customer presence using facial biometric authentication. The system combines facial authentication with biometric profiling, liveness detection, and anti-spoofing to combat credential theft, and to also provide a continuous security layer to defend from session compromise or takeovers in a continuous facial recognition authentication. Optionally, a decentralized biometric platform ensures that the biometric profile itself cannot be stolen or recombined with other personal data or other biometric data; and avoids any centralized or "honeypot" biometric database to be breached.

Second step: the system verifies the customers actions and activity. All actions are required to be executed by the customer, and fraudulent input is not accepted (such as from malware or trojan or computer virus or other form of compromise) before, during, and after the banking session (or purchase session, or checkout session, or other transacting session). The system combines continuous biometric authentication with parallel monitoring of user interactions (key presses, touch gestures, touch-screen gestures, liveness detection, device movement, spatial orientation of the device, device acceleration/gyroscope/compass unit data, or the like).

Third step: the system Hermetically Seals the transaction details; it combines all aspects of the customer verification process (biometric authentication, user inputs, and user activity/keystrokes/on-screen gestures/device properties/user gestures) into a single security stream which seals the overall activity. Only the "real" (authorized and legitimate) user can correctly seal the transaction; and an attacker (human or machine) would fail in attempting to reproduce or to fake such a seal. The AuthenticAction seal creates a yes-or-no binary verification, for both the user and the transaction; a single API call can thus validate both (i) the user authentication or identity, and (ii) the user actions as well as and the integrity of submitted data/the transaction data. The system thus provides a comprehensive solution for safeguarding the customer's online or mobile banking (or transacting, or purchasing) activities, while keeping the user experience smooth and friction-less and efficient.

Some embodiments provide efficient and unified user authentication and transaction verification via a shared video stream, that conveys and integrally embeds therein several components that are difficult or virtually impossible to replace or to fake or to inject by an attacker, and may provide efficient video-based binding of user identity with transaction data integrity.

For example, an end-user Adam is utilizing his laptop computer or his tablet or his smartphone, to enter transaction data into an electronic system; such as a banking system, a credit card system, an electronic payment system, or the like. The end-user electronic device is equipped with a camera and a microphone; and it captures a continuous video stream (and optionally also a continuous audio stream via the microphone) while the user is interacting with the electronic device, entering transaction data, and submitting the transaction data; including a few seconds (or longer time period) before the user starts entering transaction data and/or after the user finished entering/submitting transaction data.

The electronic device of the user is configured to continuously share in real time its screen (performing "Screen Sharing") with a trusted remote server, or to continuously transmit to the trusted remote server a continuous video stream or a continuous set of frames or images or screenshots that correspond to the screen of the electronic device. The real time screen sharing by the electronic device towards the trusted remote server, is an uplink transmission or an uplink screen sharing by the electronic device, such that the video content or the content of the frames/screenshots that are shared or uploaded include three components: (a) the transaction window, such as a portion of the screen where the user performs the transaction, showing fields in a form that the user filled-out, and/or showing selections that the user made from a drop-down menu or from radio button or other on-screen GUI elements that are on the website (or the app) of the bank (or financial entity, or merchant, or other entity); and also, (b) a real time video capture that shows, in a small or partial portion of the screen of the electronic device, the real time captured video from the front-side camera of the electronic device which shows the user interacting with the website (or app), thereby providing—as an integral and integrated and embedded portion of the shared video—a portion that shows the real time video stream that is captured by the front-side camera of the electronic device that is aimed at the user; and also (c) a unique, server-side generated, visual barcode or QR code or other visual representation, that is a function of the particular transaction data that is being typed, wherein such unique barcode or QR code is generated by the trusted remote server (and not locally by the electronic device) and is displayed near or behind the user's image and/or is displayed near or behind the on-screen interface or website or app that is utilized by the user for interacting.

Therefore, an attacker (human or malware) would have to perform heavy real-time video editing/video replacement, in order to attempt to generate the unique video stream that has those three components; two of them (items (b) and (c) above) cannot be predicted by the attacker; and at least one of them (item (c) above) is generated by the trusted remote server and cannot be generated or replaced or faked locally at the end-user device or on an attacker's device.

The system can prevent, catch, block, detect and/or mitigate a variety of attack scenarios, including for example: (1) An attack scenario in which the legitimate user logs-in to her bank account on her laptop computer (via a web browser or via a dedicated application or app), and then leaves her computer for five minutes, and a malware or a virus on her laptop computer maliciously accesses the banking interface to perform a fraudulent money transfer or electronic payment; this attack scenario is captured by the system of some embodiments because the video stream of the front-side camera will not show any human interacting. (2) A "coffee break" attack scenario, in which the legitimate user logs-in to her bank account on her laptop computer (via a web browser or via a dedicated application or app) at a public place (e.g., a coffeeshop, a public library) or at a semi-public or non-private place (e.g., at a workspace that is common to several people), and then leaves her computer for five minutes, and a human attacker utilizes her logged-in laptop computer to maliciously access her banking interface and to perform a fraudulent money transfer or electronic payment; this attack scenario is captured by the system of some embodiments because the video stream of the front-side camera will not show—during the transaction data entry—the face of the legitimate/authorized user, but rather will show the face of the attacker); and the system knows in advance the biometric traits and the unique face of the legitimated/authorized user and can thus detect a non-authorized human attacker. (3) An attack scenario in which the legitimate user logs-in to his bank account on his laptop computer (via a web browser or via a dedicated application or app), and then, while still logged in to the banking interface, switches to working on a word processing application or to a gaming application on that same laptop; and while the legitimate user is engaging with the word processing application or the gaming application, a malware on that laptop computer maliciously accesses the banking application (that is still running in the background and is still logged-in) to perform a fraudulent money transfer or electronic payment; this attack scenario is captured by the system of some embodiments because the video stream of the front-side camera will indeed show the legitimate user interacting, but will also show a Shared Screen video stream that indicates that the screen is actually utilized for word processing or for gaming and not for interacting with the banking website or app, thus indicating that a malware or other malicious script or trojan or virus is running in the background.

In order to generate the component (c) mentioned above and to embed it inside the shared video stream, the end-user device takes the data that the user types, in real time, and sends it to the trusted remote server; which generates a visual encoding (e.g., barcode or QR code) of the typed/ entered data, and then shows it visually in a portion of the screen of the end-user device, such as in the background of the on-screen interface or as part of the on-screen interface and/or as a virtual background to the image of the user that the front-side camera is capturing in real time and displaying on the screen of the electronic device; such that this visual encoding is captured, again, by the screen-sharing functionality that sends it back to the trusted server, which can compare or check that the on-screen encoding (as shared with the trusted server via the Screen Sharing functionality) indeed matches the visual encoding that the trusted server itself had generated a few seconds (or milli-seconds ago) and caused to be displayed on the end-user device. A mismatch would indicate to the remote server that the end-user device is compromised, by a human attacker and/or by an automated malware.

Accordingly, some embodiments may perform real time Screen Sharing with a trusted remote server, of the screen of the electronic device which includes the transaction data (which should match the data that the server received), and also includes a front-side camera video stream of the user (which should match the real user, and not another user, and should not be empty such as if the user is absent and a malware is operating). The screen sharing can be implemented as a dedicated app; or via browser; with the relevant user permissions; and/or can also be done via JavaScript, such as by taking and uploading multiple successive screenshots (e.g., several per second; although some malware can circumvent the JavaScript screen capture functionality, and therefore a dedicated app or browser extension or browser plug-in or browser add-on may be preferred, or an implementation that integrates the real time screen sharing capability as part of the browser itself or as an integral part of a banking application or brokerage application or e-commerce/merchant application.

Figure 2A:
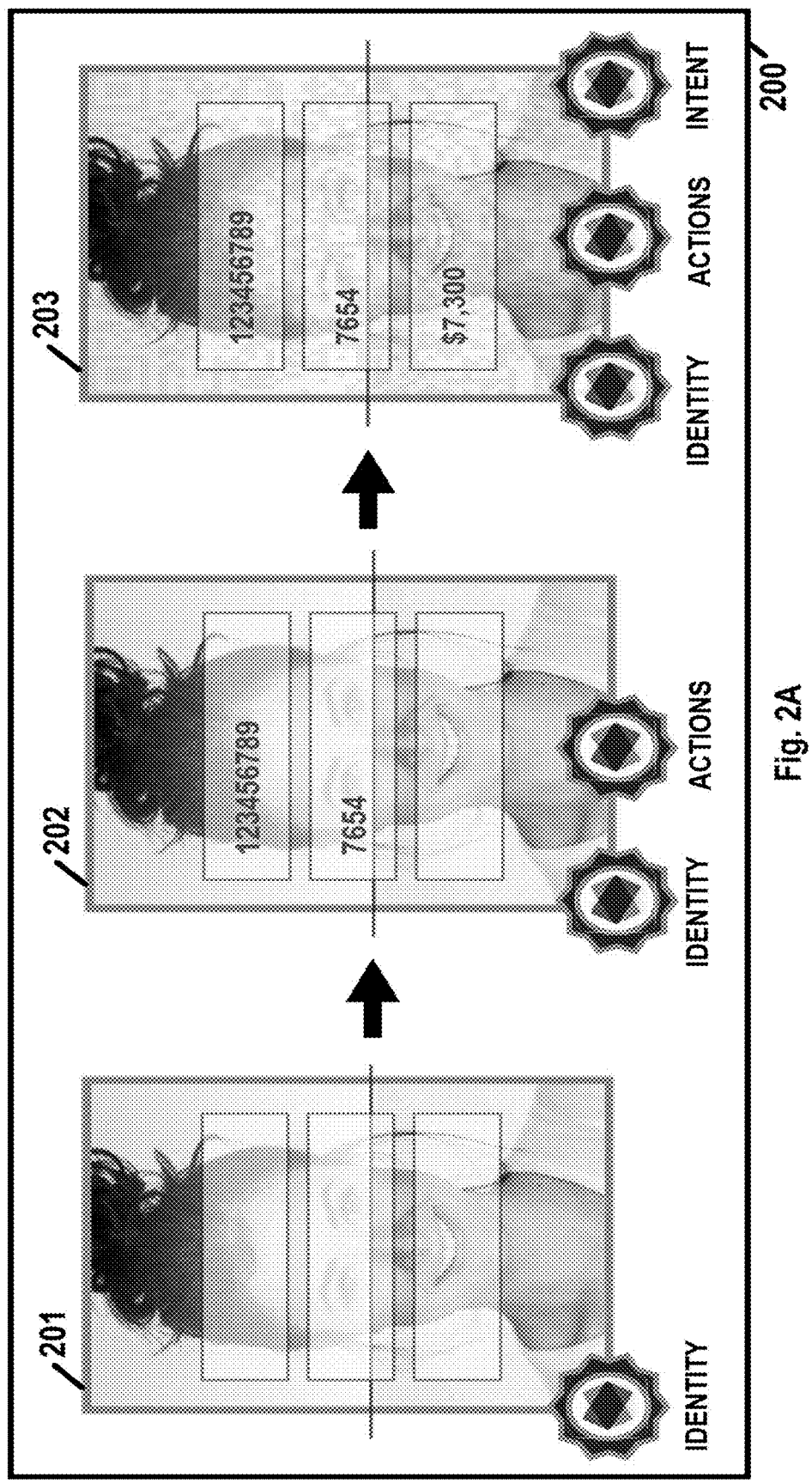
FIG. 2A is an illustration of a set of components, demonstrating the generation and display of a multiple-layer or multiple-components live real-time video stream, in accordance with some demonstrative embodiments.

Reference is made to FIG. 2A, which is an illustration of a set 200 demonstrating the generation and display of a multiple-layer or multiple-components live real-time video stream, in accordance with some demonstrative embodiments.

As demonstrated in video frame 201, an end-user Alice is accessing her banking application interface to perform a banking transaction. The screen of her electronic device shows three fields in a form that she has to fill out (e.g., beneficiary account number, routing number, and amount to transfer). Innovatively, as shown in video frame 201, the multiple fields of the form are not shown on a regular or white or solid background; but rather, there are displayed as an overlay on top of a live real-time video capture of the front-side camera or imager of the electronic device of Alice; such that the live real-time video capture of Alice (namely, the human who is interacting now with the electronic device and in front of the electronic device) is floating in the background of the fields of the form. In some embodiments, such background is dynamically changing, in real time or in near real time, reflecting momentary changes in the appearance of the user (Alice) as she blinks her eyes, moves her gaze, moves her neck, touches her face with a finger, or the like; and the background is just a dynamic video feed of the live real-time video capture from the imager of her electronic device, and not a static background, and not a single fixed non-changing frame from that was captured one time only by that imager. In accordance with some embodiments, strong biometric authentication—based on facial recognition or face recognition—is utilized in order to ensure that the user that is currently interacting with the electronic device is indeed the authorized user who had previously registered with the system and had previously created a personal profile that had already extracted and saved Reference Value(s) for his biometric traits (e.g., reference values of his facial scan; reference values of his retina scan or eyes scan; or the like; particular indicators such as eye color, eye shape, forehead wrinkles and size, hair, facial hair, ear shape, ear size, mouth size, mouth shape, or the like). In accordance with some embodiments, a live real-time feed of the video feed from the front-side camera/ imager of the electronic device, is added to the on-screen display on the electronic device itself; for example, as a partly-faded background layer that is dynamically changing, or as a reduced-contrast background layer that is dynamically changing; or, additional or alternatively, as a real-time video feed that is shown on the screen in a nearby window or tab or on-screen rectangle, nearby the on-screen area that is occupied by the fields in the form that have to be filled out for entering the transaction data.

As demonstrated in video frame 202, the user Alice is gradually entering transaction data into the fields of the on-screen form; showing that two out of the three fields already hold data that she entered. The system monitors the user interactions, and records at a trusted remote server—or sends from the end-user device to the trusted remote server—the keystrokes and other user interactions or user gestures in real time or in near real time as they are performed by the user, even before the user clicks on a "Submit" button or GUI element. The electronic device and the trusted remote server further monitor and log the user interactions, the data that is being entered as well as changes or modifications made to it (e.g., character typing, character deletion, character replacement, paste operations, or the like), and further monitor interactions of the user with input units of the electronic device (e.g., physical keyboard, touch-screen, mouse, touchpad) to ensure that the data that appears in the form fields, and/or the data that is sent to the server and/or is received at the server, is indeed matching to or corresponding to such user interactions (e.g., generating an alert if the keyboard registered only 8 keystrokes in the "account number" field but the account number that was submitted is 9 characters long), to thus detect or block or prevent data replacement by a malware or a trojan or automated script or virus that may be running on the electronic device of Alice. The system thus monitors data entry and data changes as well as input unit interactions, with continuous biometric-based user authentication, to ensure that the actions of the user are not being manipulated (e.g., by a malware). As data is entered and possibly modified by the user, the presentation layer of both the transaction entry and the user change, and are captured concurrently as part of the live video feed that is continuously being captured and streamed to the trusted server.

As demonstrated in video frame 203, a feedback challenge loop is generated and displayed on the screen of the electronic device of Alice, such as the additional background layer (e.g., slightly faded out or partially grayed out) showing a barcode or a QR code that represents the transaction data that was received so far at the trusted remote server, encrypted or encoded and/or hashed with a secret key or a secret hashing salt that is known only to the trusted remote server and is not known to the electronic device of Alice. The displayed barcode or QR code may be fully visible on the screen of the electronic device of Alice; or may be partially shown, or may be partially obscured or hidden by the face of user Alice which may temporarily hide some of it; yet at least the visible portions of such barcode or QR code should suffice to enable the trusted remote server to compare or to check that the visual information that is displayed on the screen is indeed part of the visual representation that the trusted remote server has sent back to the electronic device of Alice (over a secure communication channel, such as HTTPS or SSL/TLS); or conversely, enabling the remote trusted server to detect that at least some part of that visible portion of the QR code or barcode that is displayed on the screen and that is relayed back to the trusted remote server via Screen Sharing functionality, does not match the server-generated visual representation or QR code or barcode that is expected to be seen there, thereby indicating that an attacker or a malware interfered. The visual representation that is shown as an overlay, behind (or near) the live video feed of the user's face and the fields of the form that is being filled out or that was just filled out, enable the trusted remote server to verify that the transaction data that was received by the server, indeed matches the original intent of the legitimate user and not replaced data or fake data or manipulated data that a malware has manipulated or added or replaced or injected. Accordingly, the true and non-manipulated User Intent (and the true input of the legitimate user) is captured by dynamically generating (on the trusted remote server) visual elements (e.g., barcode or QR code) representing data as received at the trusted remote server and by having the electronic device of the user embed back those visual representations into the on-screen display that is shown to the user and that is also shared upstream with that trusted remote server. These feedback challenge images or frame-portions are indiscernible to the user (or to an attacker, human or machine), yet remain digitally discernable and verifiable by and at the trusted remote server that generated such visual data. These feedback challenge images or frame-portions cannot be faked or replaced or generated correctly by an attacker (human or machine), as such attacker—even if it secretly listens via a keylogger to the data that is manually entered at the electronic device—does not know which function and which parameters are utilized by the trusted remote server to generate the unique and dynamically-changing visual representation that is embedded back as part of the video feed that is uploaded back to the trusted remote server.

Figure 2B:
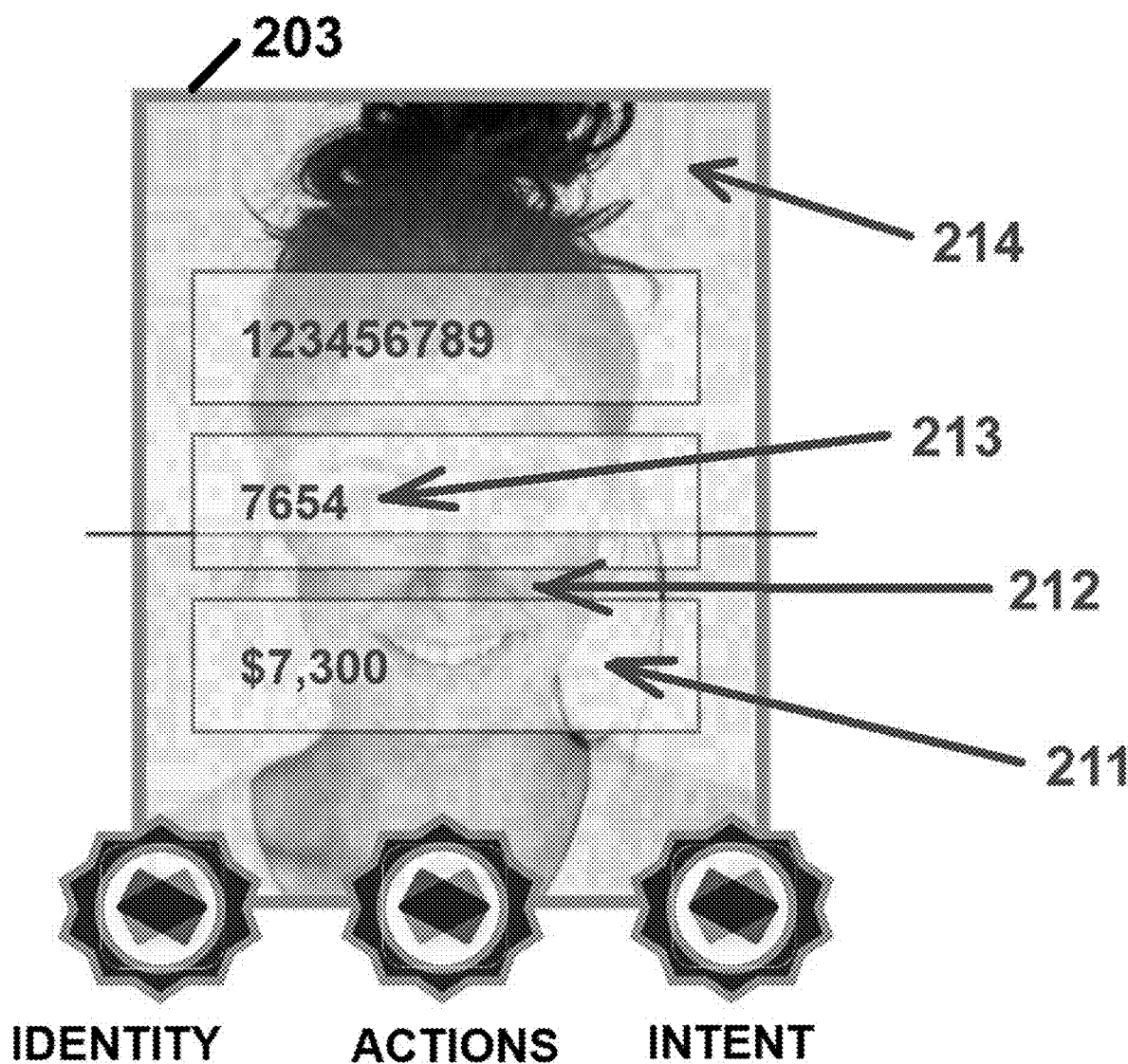
FIG. 2B is an enlarged view of a video frame, which may be generated and utilized in accordance with some demonstrative embodiments.

Reference is made to FIG. 2B, which is an enlarged view of video frame 203 discussed above, which may be generated and utilized in accordance with some demonstrative embodiments. Arrow 211 indicates a fillable field in the on-screen form; Arrow 213 indicates a string of user input that was typed into a fillable field; Arrow 212 indicates the live real-time feed of the image of the user (e.g., Arrow 212 pointing to the nose of the user) which is an overlay layer shown behind the fillable fields of the form; Arrow 214 shows a virtual background of the face of the user, such that the virtual background shows the visual representation (e.g., QR code or barcode) that were generated secretly by the trusted remote server based on a secret cryptographic key and/or a secret cryptographic hashing salt and further based on the transaction data that the trusted remote server has received so far from this electronic device during this transaction entry session.

Figure 2C:
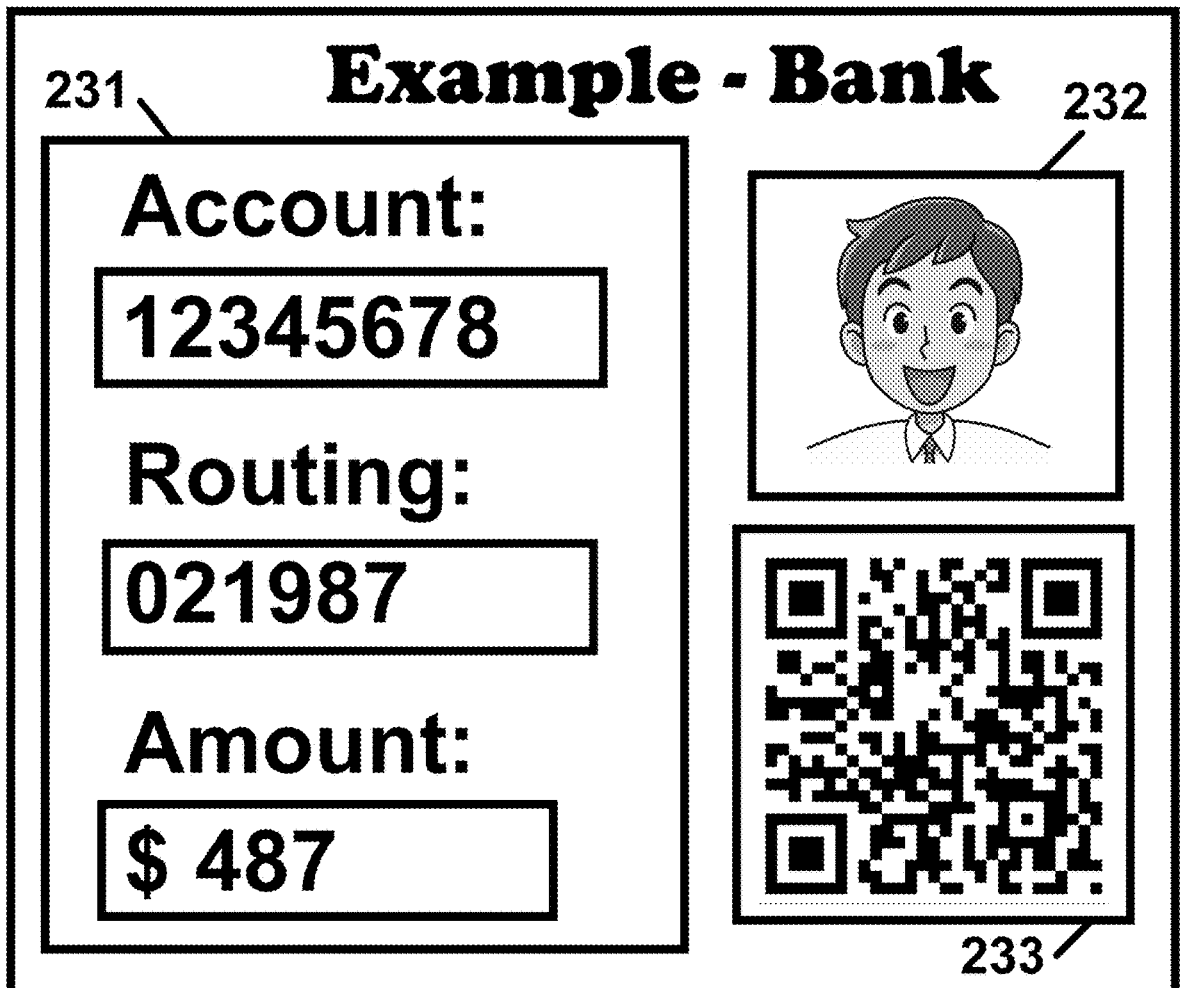
FIG. 2C is an illustration of another video frame, which is a live real-time or near-real-time screenshot of the screen as displayed of the electronic device of the end-user, in accordance with some demonstrative embodiments.

Reference is made to FIG. 2C, which is an illustration of a video frame 230 which is a live real-time or near-real-time screenshot of the screen as displayed of the electronic device of the end-user, in accordance with some demonstrative embodiments. The screenshot may depict, for example, a window of a web-browser or a native application or app of "Example Bank", and it includes three components: (a) a region 231 of fillable on-screen fields of an on-screen form, which includes fields and/or other interactive GUI elements that the user can engage with (e.g., drop-down menu, radio button or other selection button, checkboxes, or the like); (b) a region 232 that shows real-time video that is currently being captured by the front-side camera/imager of the electronic device, typically showing the face of the user; (c) a region 233 that shows a visual representation, such as a barcode or a QR code or other visual representation, which represents the content of the transaction data and/or the already-filled-out fields, after such transaction data or content had gone a cryptographic transformation on the trusted remote server (e.g., via a cryptographic encryption and/or hashing, using a secret key and/or a salt value that is known only to that trusted remote server), wherein that visual representation of the server-transformed transaction data in region 233 is not generated locally within or by the electronic device of the end-user, but rather, is generated exclusively at or by or in the trusted remote server which then sends the visual representation to the electronic device of the end-user via a secure communication channel (e.g., over HTTPS, via TLS-SSL, or the like).

Figure 2D:
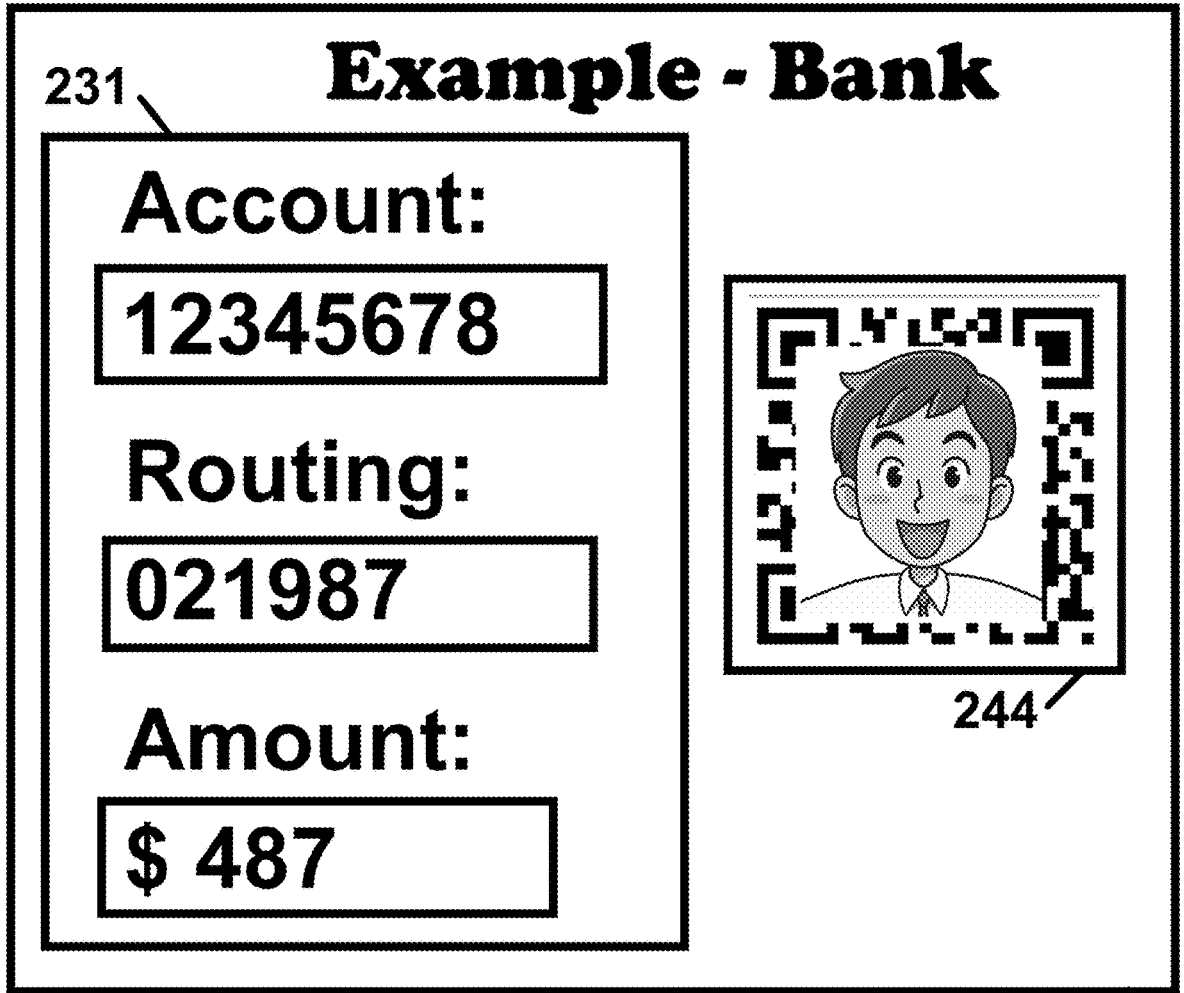
FIG. 2D is an illustration of another video frame, which is a live real-time or near-real-time screenshot of the screen as displayed of the electronic device of the end-user, in accordance with some demonstrative embodiments.

Reference is made to FIG. 2D, which is an illustration of a video frame 240 which is a live real-time or near-real-time screenshot of the screen as displayed of the electronic device of the end-user, in accordance with some demonstrative embodiments. The screenshot may depict, for example, a window of a web-browser or a native application or app of "Example Bank", and it includes two regions: (a) a region 231 of fillable on-screen fields of an on-screen form; (b) a region 244 which shows an overlay of two components, which are: (b1) real-time video that is currently being captured by the front-side camera/imager of the electronic device, typically showing the face of the user, which is presented as an overlay over (b2) a visual representation, such as a barcode or a QR code or other visual representation, which represents the content of the transaction data and/or the already-filled-out fields, after such transaction data or content had gone a cryptographic transformation on the trusted remote server (e.g., via a cryptographic encryption and/or hashing, using a secret key and/or a salt value that is known only to that trusted remote server), wherein that visual representation of the server-transformed transaction data in region 244 is not generated locally within or by the electronic device of the end-user, but rather, is generated exclusively at or by or in the trusted remote server which then sends the visual representation to the electronic device of the end-user via a secure communication channel (e.g., over HTTPS, via TLS-SSL, or the like). In some embodiments, as demonstrated in FIG. 2D, the video feed is an overlay on top of the visual representation of the transaction data. In other embodiments, their order may be swapped or reversed, such that the video feed of the user's face is a background feed or a slightly-faded dynamic background, and the visual representation of the transaction data is the foreground image or the on-top overlay component.

Figure 2E:
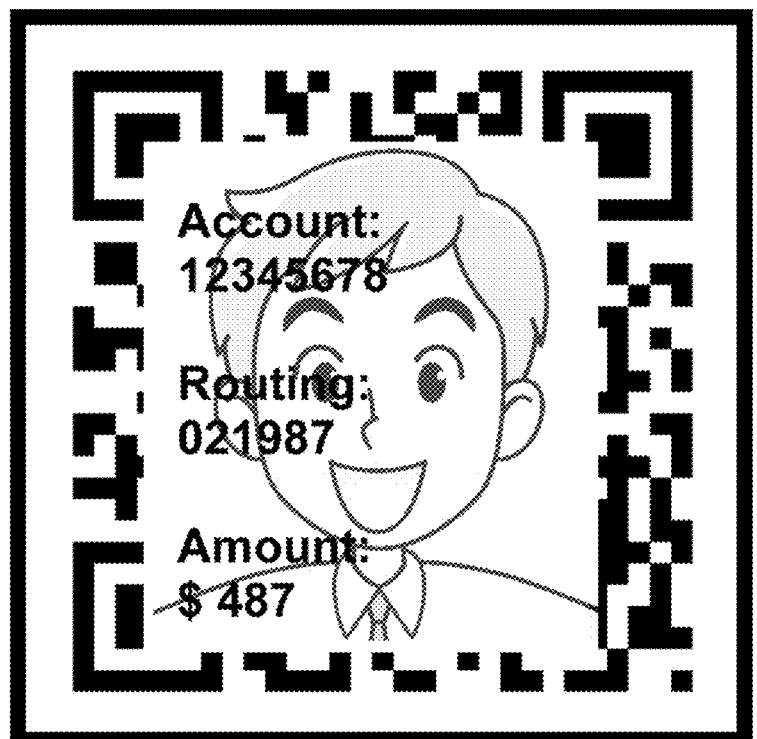
FIG. 2E is an illustration of another video frame, which is a live real-time or near-real-time screenshot of the screen as displayed of the electronic device of the end-user, in accordance with some demonstrative embodiments.

Reference is made to FIG. 2E, which is an illustration of a video frame 250 which is a live real-time or near-real-time screenshot of the screen as displayed of the electronic device of the end-user, in accordance with some demonstrative embodiments. The screenshot may depict, for example, a window of a web-browser or a native application or app of "Example Bank", and it includes a region 255 that includes three overlay components, in the following order or in other overlay order: (a) fillable on-screen fields of an on-screen form; as an overlay component on top of: (b) real-time video that is currently being captured by the front-side camera/imager of the electronic device, typically showing the face of the user, which is presented as an overlay over (c) a visual representation, such as a barcode or a QR code or other visual representation, which represents the content of the transaction data and/or the already-filled-out fields, after such transaction data or content had gone a cryptographic transformation on the trusted remote server (e.g., via a cryptographic encryption and/or hashing, using a secret key and/or a salt value that is known only to that trusted remote server), wherein that visual representation of the server-transformed transaction data in region 255 is not generated locally within or by the electronic device of the end-user, but rather, is generated exclusively at or by or in the trusted remote server which then sends the visual representation to the electronic device of the end-user via a secure communication channel (e.g., over HTTPS, via TLS-SSL, or the like). In some embodiments, as demonstrated in FIG. 2E, the fillable forms are an overlay on top of the video feed, which in turn is an overlay on top of the server-transformed visual representation of the transaction data. In other embodiments, their order may be swapped or reversed or re-ordered.

Figure 2F:
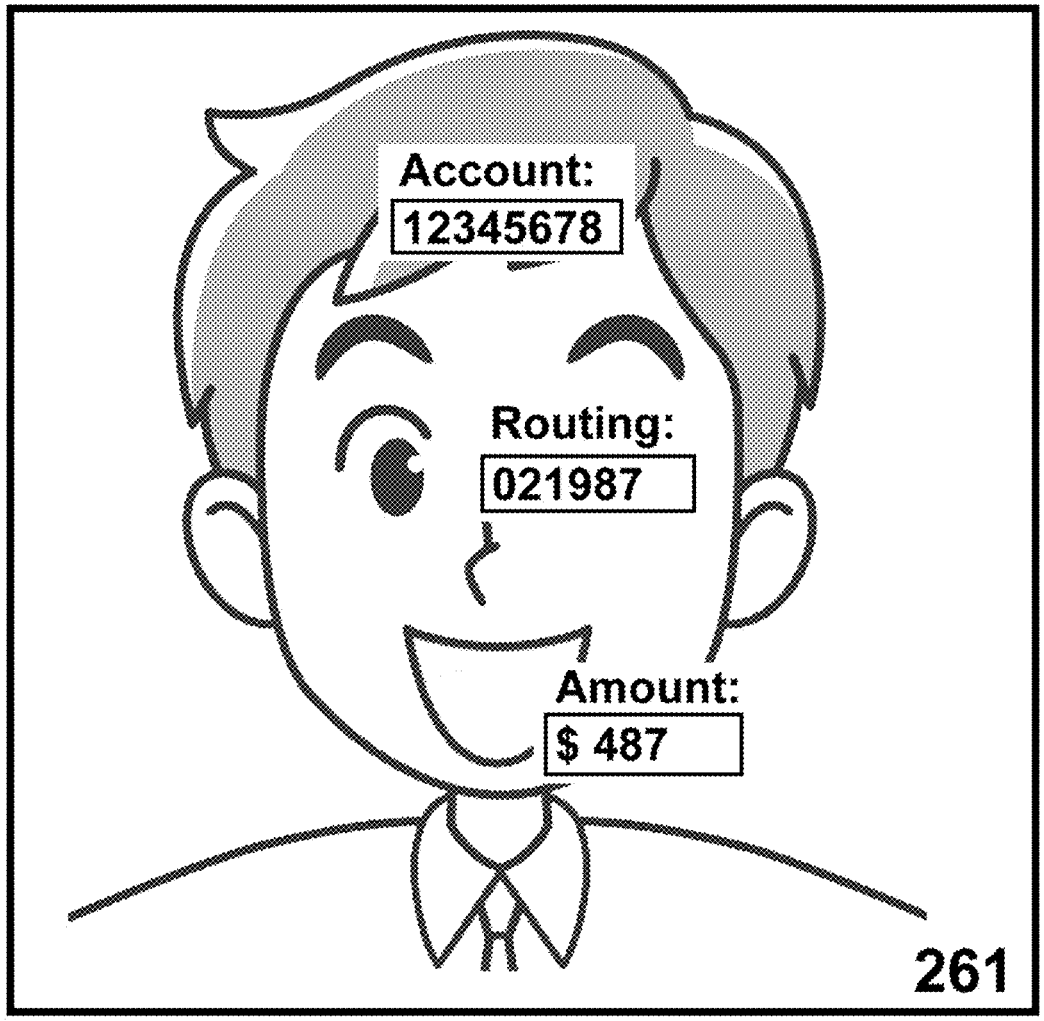
FIG. 2F is an illustration of another video frame, which is a live real-time or near-real-time screenshot of the screen as displayed of the electronic device of the end-user, in accordance with some demonstrative embodiments.

Reference is made to FIG. 2F, which is an illustration of a video frame 260 which is a live real-time or near-real-time screenshot of the screen as displayed of the electronic device of the end-user, in accordance with some demonstrative embodiments. The screenshot may depict, for example, a window of a web-browser or a native application or app of "Example Bank", and it includes a region 261 that includes two overlay components, in the following order or in other overlay order: (a) fillable on-screen fields of an on-screen form; as a foreground overlay component on top of: (b) real-time video that is currently being captured by the front-side (or user-facing) camera/imager of the electronic device, typically showing the face of the user.

The Applicant has realized that no conventional systems have generated and/or displayed a real-time, continuous, currently-captured, dynamically-updated, video of the user who enters data towards submitting an online electronic transaction, while the user himself is concurrently or simultaneously entering/typing the transaction data for such electronic transaction that the user is about to submit and transmit to a Remote Server for commanding/requesting an online transaction that would be performed or fulfilled away/remotely from the end-user device that the user is utilizing for transaction data entry.

The Applicant has realized that there can be achieved an added level of security, that can deter human cyber-attackers and/or automated cyber-attack modules or malware (as well as the humans that deploy or program such malware), from attempting to perform an Online Fraudulent Transaction, or from attempting to submit an online transaction while posing to be the legitimate user, or from attempting to submit an online transaction while utilizing stolen or compromised credentials of a legitimate user, if the online session, in which the user is entering transaction data, is innovatively modified and configured such that the user-facing/front-side camera of the electronic device (that is utilized for transaction data entry) is capturing live video data of the user's face (or upper-body area) and while also causing the screen of that end-user device (that the user is utilizing for entering the data for the online electronic transaction) to dynamically and continuously display that live captured video feed; which is displayed, continuously and in real time, near the fillable fields or form (or other on-screen GUI elements, such as drop-down menu, selection buttons) the online electronic transaction, or as a background layer behind such fillable fields or form or other on-screen GUI elements, such as drop-down menu, selection buttons) of the online electronic transaction.

The Applicant has realized that a conventional system has included, at most: an Automatic Teller Machine (ATM) that secretly and locally takes pictures or videos of the user that transacts with the ATM, but Without displaying on the ATM screen any live captured video feed that would be displayed to the user himself while he is interacting with the ATM. In contrast, some embodiments of the present invention may further provide an ATM or similar Point-of-Sale terminal, that includes (A) a user-facing/front-side camera, that captures a live, real time, video feed of the user that interacts with the ATM or the PoS terminal; and (B) a digital touch-screen, that displays, concurrently and continuously, both: (B1) the live, real time, video feed as captured by the front-side/user-facing video camera of the device, and (B2) one or more on-screen fillable fields (or other user engageable GUI elements) that enable the user to perform a local transaction (e.g., to withdraw cash money from an ATM; to deposit a check into an ATM; to perform self-checkout at a PoS terminal of a brick-and-mortar retailer). The Applicant has realized that an innovative configuration as described above, may cause a reduction in fraud attempts or malicious transactions that are attempted against such ATM or against such PoS terminal, or against a computerized system and/or a local server and/or a remote server that is operably in communication with such ATM or such PoS terminal.

In some embodiments, the above-mentioned on-screen components may be displayed, and then stream via an uplink back to the trusted remote server; to enable the trusted remote server to process such live video feed, and to continuously authenticate the identity of the interacting user (based on the video feed from the front-side camera of the electronic device), and to further enable the trusted remote server to continuously verify the integrity of the transaction data (by comparing between (i) the visual representation or QR code or barcode, of the server-transformed transaction data as they appear within the screenshot/video-frame that is uploaded or up-streamed from the electronic device to the remote server, and (ii) a copy of that server-transformed visual representation of transaction data that this trusted remote server had stored when it sent it to the electronic device for displaying on the screen).

Reference is made to FIG. 3, which is an illustration that demonstrates a system 300 and its flow of operations, in accordance with some demonstrative embodiments. An entity server 303 is a server of the protected entity, such as a bank or a merchant. Device 302 is the end-user device, such as a smartphone, a tablet, a laptop computer, a desktop computer, or other electronic device that is equipped with a front-side or user-facing camera/imager. Server 301 provides the AuthenticAction service or platform discussed above and/or herein.

In accordance with some embodiments, the protected entity adds or deploys or utilizes or invokes a Software Development Kit (SDK) or other component, and selectively defines or configures particular Sensitive Actions or Increased-Security Actions that should invoke the AuthenticAction binding seal. For example, the bank server may define that (i) an action of "view my balance" (or "contact us" or "view the FAQ") is not sensitive, and does not require to invoke increased security and the binding seal; whereas (ii) an action of "wire transfer" (or "log in", or "make a payment", or "add a new payee") is sensitive, and requires to invoke increased security and the binding seal. As indicated by circle "1" in FIG. 3, the entity server 303 sends content and data to device 302 over a secure communication channel, such as HTTPS or SSL-TLS; and similarly, device 302 sends data to the entity server 303 over such secure communication channel.

As indicated by circle "2" in FIG. 3, the AuthenticAction SDK or module on device 302 is configured to continuously monitor user authentication, user actions and user presence, and is in charge of sending verifiable details through a secondary secure channel to the AuthenticAction server 301 to enable transaction-and-user binding.

As indicated by circle "3" in FIG. 3, a Sensitive Action (e.g., a transaction that was pre-defined by the protected entity as requiring the increased security of a binding seal) that is received from device 302, is verified or validated through RESTful API calls that the protected entity server 303 makes towards the AuthenticAction server 301.

Figure 4:
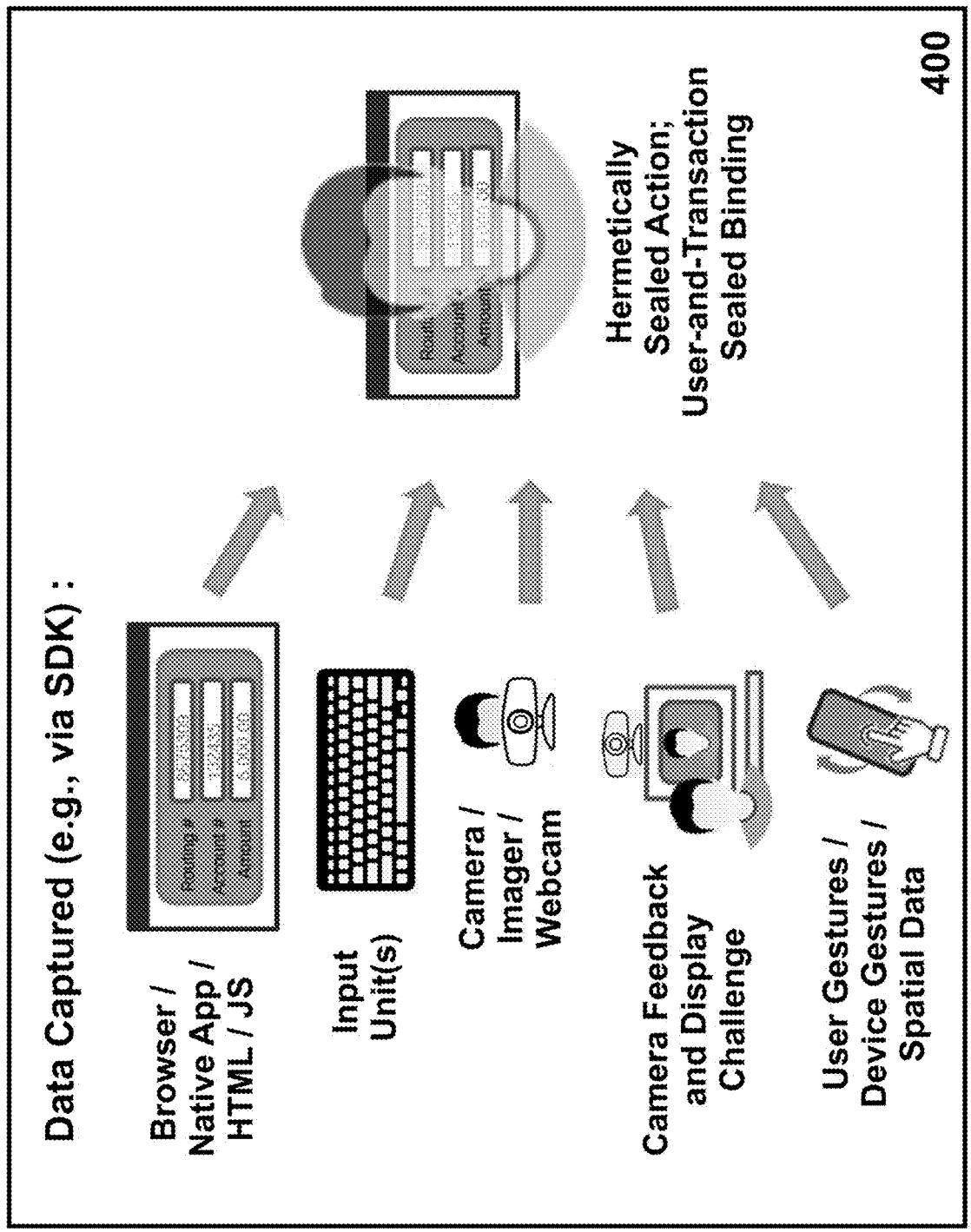
FIG. 4 is an illustration of a set of data-items that are captured and then bound together, in accordance with some demonstrative embodiments.

Reference is made to FIG. 4, which is an illustration of a set 400 of data-items that are captured and then bound together, in accordance with some demonstrative embodiments. The data-items may be captured or collected or sensed via SDK calls, or via a dedicated code-segment which may be an integral part of the code of a browser (or a browser extension/plug-in/add-on) or a mobile application or "app" or a web-based app, or may be part of a native application or a stand-alone application, or may be an extension or plug-in or add-on to another application (e.g., a banking application of a particular bank; an online shopping application of a particular merchant); and/or may be implemented using HTML, and/or JavaScript and/or other suitable programming languages or coding techniques.

The data collected and intended for binding includes, for example: (a) transaction data that the user typed or entered into fields or other GUI elements; (b) data captured from input unit(s) of the electronic device, such as from keyboard, mouse, touchpad, keypad, touch-screen; (c) video data or video frames or image(s) captured via a front-side/user-facing camera or imager or webcam; (d) a camera-based/video-based feedback-and-display challenge, in which the trusted remote server causes the electronic device to display a unique, server-generated, and optionally dynamically-changing visual representation, which may be based (via a cryptographic transformation) on the already-entered or the so-far-entered transaction data, and which is displayed on the screen of the electronic device that in turn is shared back via Screen Sharing (or a similar screen-streaming mechanism) towards the trusted remote server; and (e) data representing or indicating user gestures (e.g., swipe gesture, tap, double-tap, click, double-click, scroll gesture, zoom-in gesture, zoom-out gesture, or the like) that the user performs with his finger(s) and/or with his hand(s) on a touch-screen of the electronic device and/or on the entirety of the electronic device (e.g., causing the entirety of the electronic device to rotate or move or spin or accelerate or decelerate in one or more spatial directions, or other device gestures that are performed by the user on the entirety of the device in a spatial manner), and/or spatial data or spatial properties (e.g., device orientation, device acceleration, data from gyroscope(s) or compass unit(s) of the device), device tremor data (indicating that the device is shaken or moved or is non idle along one or more directions); and/or other data.

In some embodiments, the data that is further utilized for binding may optionally include: one or more additional data items, that are generated exclusively at the trusted remote server, and that are generated in a transformative method from data that is other than the transaction data, or from data that includes some or all of the transaction data combined with additional unique data; for example, server-generated data that is produced as visual representation (displayed on the screen of the electronic device, and then live-streamed via an uplink back to the remote server for verification) that is derived from particular data-items that are in the user profile (e.g., user date-of-birth, user home address, user billing address, user gender indicator, or the like), such that such server-generated data may optionally be generated every T seconds or milliseconds from a set of one or more data-items that are selected on the server side from the user profile and/or from other source(s) that are generally confidential or that only the trusted remote server has and/or that an attacker is less likely to know or to have.

Figure 5:
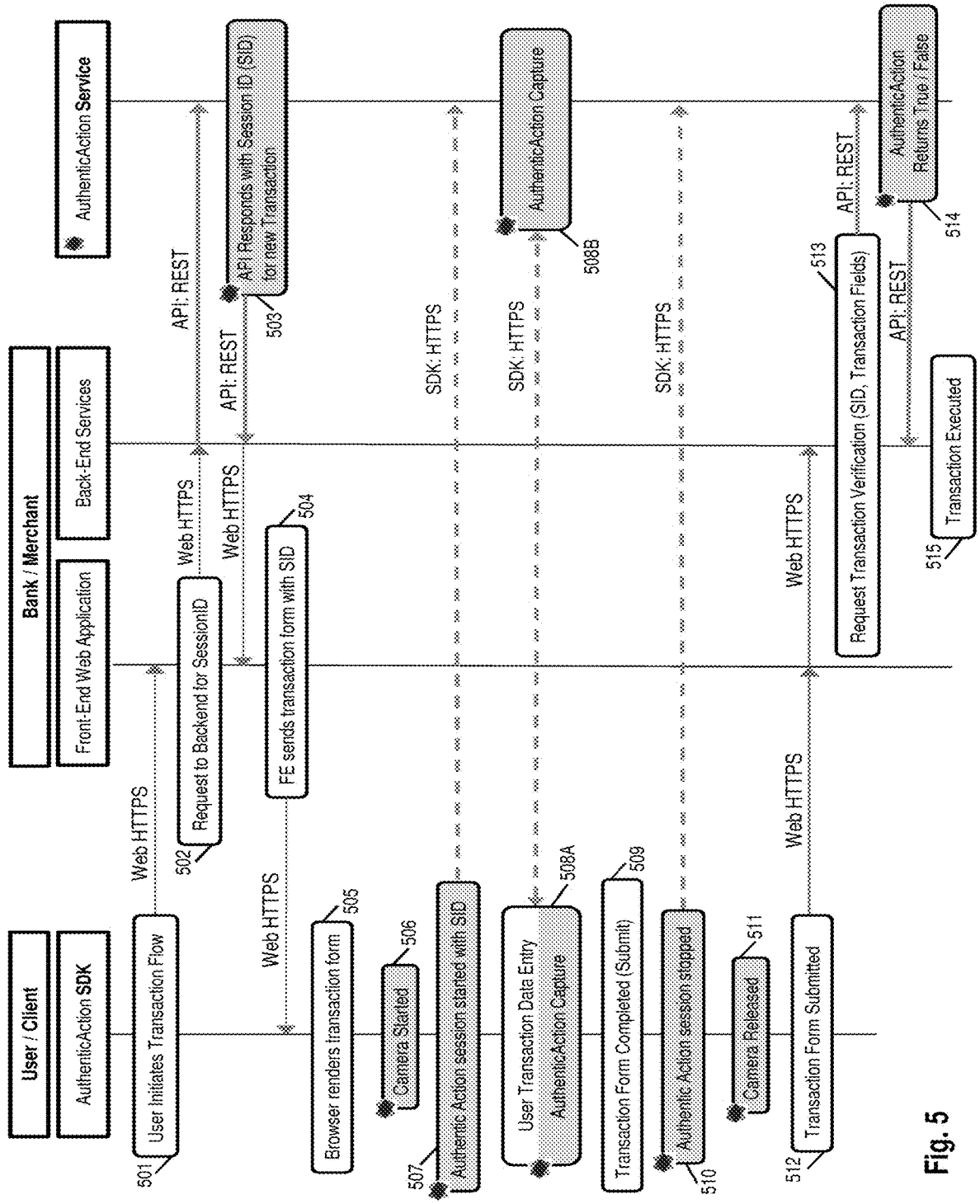
FIG. 5 is a flow-chart of operations of a method, in accordance with some demonstrative embodiments.

Reference is made to FIG. 5, which is a flow-chart of operations of a method, in accordance with some demonstrative embodiments. It demonstrates interactions between a user/client (having an end-user electronic device that is augmented with the AuthenticAction SDK or other suitable module or unit), interacting with a bank/merchant (or other protected entity) having front-end (FE) server(s) or application(s) and having back-end (BE) server(s) or application(s); and further showing the AuthenticAction service, which may run on a separate server of a trusted third party (e.g., a provider of cyber-security services, a provider of user authentication and transaction verification services) or which may optionally be an internal or integral server of that same bank or merchant (or other protected entity).

Blocks 501 and 502: the user initiates a transaction flow; and sends to the Front-End server, over Web HTTPS, a request for a Session-ID (unique identifier for this session). The Front-End server sends the request to the Back-End server, over Web HTTPS or via other secure communication channel. The Back-End server sends a Session-ID request, over RESTful API, to the AuthenticAction server.

Block 503: the AuthenticAction server responds by sending a new Session-ID for the new transaction, over RESTful API, to the Back-End server; which in turn sends the Session-ID to the Front-End server (over Web HTTPS, or other secure communication channel).

Block 504: the Front-End server sends to the end-user device, over Web HTTPS, the Session-ID and the form/fields that the user is required to fill-out in order to request the transaction.

Block 505: the end-user device renders the fields/form, via its web browser or via other mechanism (e.g., via a dedicated app, a native app, or the like).

Block 506: the user-facing/front-side camera of the end-user device is automatically activated, and starts to capture a live video feed; the live video feed is both (i) displayed within the screen of the end-user device, and (ii) uploaded in real time via a Screen Sharing functionality to the remote AuthenticAction server.

Block 507: a new AuthenticAction session is started on the end-user device, having the Session-ID that was assigned; the end-user device informs the Session-ID to the remote AuthenticAction server over SDK HTTPS.

Blocks 508A and 508B: the user enters transaction data into the fields/form; and the AuthenticAction module on the end-user device captures user interactions, input-unit gestures/keystrokes/input signals, entered or typed or user-selected data, device properties (spatial orientation, acceleration, gyroscope, compass unit, device orientation sensors), and particularly also causes the live video feed to be displayed within the screen of the end-user device and further causes that screen to be continuously shared via a Screen Sharing functionality with the remote AuthenticAction server. The data is sent from the end-user device directly to the remote AuthenticAction server over SDK HTTPS.

Block 509: the user completes the entry of the transaction data, and presses or clicks or taps "Submit" (or other suitable GUI element to indicate submission or sending out or commanding to execute the requested transaction). In response, the AuthenticAction session is closed or stopped (Block 510), by the end-user device indicating so to the remote AuthenticAction server over SDK HTTPS; and the camera of the end-user device is turned-off or deactivated or released from capturing live video (Block 511).

Block 512: the filled-out form data is sent over Web HTTPS from the end-user device to the Front-End server; which in turn sends it (over Web HTTPS, or other secure channel) to the Back-End server.

Block 513: the Back-End server sends to the AuthenticAction server a request for transaction verification, over RESTful API; the request including the Session-ID and the filled-out transaction data that the Front-End/Back-End servers received from the end-user device.

Block 514: the AuthenticAction server returns, over RESTful API, a true or false response to the Back-End server.

Block 515: If the AuthenticAction server returned a "true" response, then the Back-End server executes or processes the transaction that the user submitted. If the AuthenticAction server returned a "false" response (or, in some embodiments, did not return any response for at least T seconds), then the transaction is not executed, or the transaction is denied or blocked, or the transaction is put on hold for manual review.

Some embodiments may prevent or detect or mitigate an Account Takeover attack; for example, attempted via "phishing" of user credentials, via social engineering that obtains user credentials, via data breach or security breach that enable an attacker to get hold of user credentials, or other attacks. Account Credentials that are stolen can allow attacker to establish his own session with the bank/merchant; and even with step-up authentication or 2FA or MFA, the legitimate user can be tricked out of her 2FA/MFA code. Some embodiments prevent or mitigate such attacks by providing continuous and strong biometric authentication of the interacting user, particularly via face recognition in an ongoing live real-time video feed of a user-facing camera, to authenticate the user's identity and the user's continuous and actual presence.

Some embodiments may prevent or detect or mitigate a Session Takeover attack; for example, attempted via Cookie Theft, third-party code injection, Cross-Site Request Forgery (XSRF), or other attacks. In such attacks, an attacker operates to bypass strong authentication by taking over an already-established user session or usage session, shortly after the legitimate user has already/recently logged-in and/or authenticated. Some embodiments prevent or mitigate such attacks, for example, by Binding Authentication to Actions; by requiring and verifying Continuous User Presence; and by Binding of Data Capture Events with User Biometrics.

Some embodiments may prevent or detect or mitigate an Adversary-in-the-Middle (AITM) attack or a Man-in-the-Middle (MITM) attack; for example, attempted by using a rogue Wi-Fi hotspot, via a "phishing" link to look-alike/fake website, or the like. In such attacks, once an authenticated session is established, the adversary-in-the-middle can change or replace the user-submitted data; for example, replacing the beneficiary account number or the payment amount in a funds transfer, or replacing the shipping address in an online purchase. Some embodiments prevent or mitigate such attacks by Binding Authentication to Actions, and by Binding of Data Capture Events with User Biometrics.

Some embodiments may prevent or detect or mitigate an Endpoint Compromise attack; for example, attempted via a malware, or a Man-in-the-Browser attack, or a Remote Access Trojan (RAT) attack; optionally attacking via a malware or virus infection, a malware sent via email or downloaded, or via a third-party library code injection. In such attacks, the malware operates behind the scenes, changing or replacing transaction data submissions (e.g., beneficiary account number, payment amount, shipping address) to the benefit of the attacker, while also showing the user what the user expects to see (the original unchanged data as entered), such that the user is still fully engaged and thinks that nothing is wrong. Some embodiments prevent or mitigate such attacks by Binding Authentication to Actions; by Binding of Data Capture Events with User Biometrics; by On-Screen Live Presentation Capture with Camera Feedback; with a Feedback Loop with Dynamic (server generated) visual representation Challenge.

Some embodiments may prevent or detect or mitigate a "friendly fraud" attack or a "first-party fraud" attack; for example, a Family Member Account Fraud (e.g., a teenager using his parent's laptop computer to perform a transaction in the parent's bank account or an online shopping account), or other scenarios of "Authorized Fraud" (Bogus Fraud Reports; Buyer's Remorse/Gambler's Remorse). In such scenarios, the bank or the merchant is put in the position of having to treat its own customer as an adversary; and in some situations, the primary account holder (e.g., parent) may not even be aware of the illegitimate use of their account (for example, by an unauthorized family member or home tenant). Some embodiments may prevent or mitigate such attacks, by Binding Authentication to Actions, to stops "friendly fraud"; may provide Assurance, as the bank/merchant can know whether or not it was the real user who committed the transaction; may provide Practical Deterrence, as the user is less likely to initiate bogus fraud claims when the user is biometrically authenticated while he is executing transactions. Some embodiments may capture and then utilize sufficient data—including video data and/or user-specific behavioral data—to combat or to prevent some forms of "authorized fraud" and/or bogus fraud claims.

Some embodiments may prevent or detect or mitigate a malware-based Display Overlay attack. For example, the user enters transaction data, and sees on the screen of his end-user device the original transaction data that he typed; a malware is running in the background on his end-user device, and replaces the data that is being transmitted to the bank's server. For example, the legitimate user entered data indicating a request to transfer the amount of "$678" to the recipient account "12345"; but the malware intercepted the data and transmitted maliciously-replaced data to the bank server, requesting to transfer the amount of "$999" to the recipient account "88877". The malware ensures that the end-user continues to see, on the screen of his end-user device, the amount and the beneficiary data that he had entered, and not the fake/replaced data. However, the AuthenticAction service or server would catch such fraud; for example, the AuthenticAction module that runs on the end-user device or that is invoked from the end-user device, monitors and logs interactions of the user with the end-user device, and logs that the user has typed "678" and "12345"; and those user-typed data-items are the data that is utilized for Binding the transaction data with the user identity (biometric trait, facial recognition); and the server-side generated visual representation would correspond to the original, user-typed, data items of "678" and "12345", and not to the later-replaced fake data items "999" and "88877"; the transaction data that the bank/merchant received, which included the maliciously-replaced fake data, do not match the original user-typed transaction data that the AuthenticAction monitored and logged and bound to this transaction and to this user identity.

Some embodiments may thus provide an AuthenticAction platform that can: determine if actions have been manipulated; link the action with the user who logged in; reduce authentication and re-authentication fatigue on users; provides a low-effort integration model; provide a private and hermetic seal that binds transaction data with user identity, prevents and stops fraud/attacks, and provides a singular, binary type, true-or-false response to the bank/merchant with regard to the bound user identity and transaction integrity.

Some embodiments may provide or implement the AuthenticAction platform or solution or service, in the context of an enterprise or organization, and not necessarily/ and not only in the context of an individual user. The service may have real-time operative linkage or operative association to a third-party system and/or to a first-party/organizational/enterprise system, or may be provided as an extension/plug-in/add-on/expansion to an organizational/ enterprise system; or may be implemented as a stand-alone unit or application, or as a sub-system that communicates in real time with an organizational/enterprise system; and/or as a browser extension/add-on/plug-in, or as a desktop application (e.g., external to a web browser, to provide the capability of monitoring and logging non-browser events, or interactions that occur outside the browser), or even as part of an Operating System. The AuthenticAction for enterprises and organizations may protect employee access to external systems (e.g., the Amazon Web Services (AWS) console, the Google Cloud Platform (GCP) console, the Microsoft Azure cloud services console, a Google Ads platform or console, a Cloudflare platform or console, or the like); by comparing between (I) the user's actions/gestures/ inputs/interactions, as monitored and logged and recorded locally at the end-user device that the user (e.g., the employee) is utilizing, via the innovative app or extension, with (II) real-time log(s) and/or retrospective audit log(s) of the external (protected) system or the third-party system that the employee is attempting to access on behalf of his organization/enterprise. In some embodiments, this may be achieved without necessarily requiring any code integration or program installation.

In a demonstrative flow of operations, for example: (1) The employees of the organization/enterprise, or an administrator on their behalf, install on end-user devices (e.g., laptop computer, desktop computer, smartphone, tablet) a browser extension/plug-in/add-on or a native application or app that provides the AuthenticAction protection service. (2) The AuthenticAction extension or module performs monitoring, tracking and logging of the user activities and interactions, in general or particularly at specific/pre-defined/ admin-configurable list of sites or domains or pages (e.g., the AWS console, the GCP console, the Azure portal or console, or the like). (3) The AuthenticAction module sends to the AuthenticAction server, in real time or in near real time, user identity data (e.g., based on one or more user-specific biometric traits that are extracted from a biometric sample) and transaction data (e.g., as inputted by the user on his end-user device). (4) The AuthenticAction server connects to real-time/recent/past audit logs of the relevant/ critical systems (e.g., the AWS CloudTrail or AWS CloudTrail Lake which provides a managed audit and security dataset and further consolidate or combine or aggregate two or more such logs from multiple sub-systems). (5) The AuthenticAction server compares between (I) transaction data/commands data/action data, as reflected in those logs, and (II) the transaction data and inputted by the employee and as monitored locally by the AuthenticAction extension on the employee's end-user device (and as sent securely from the employee's end-user device to the AuthenticAction server over a secure communication channel). (6) If the AuthenticAction server detects a mismatch or an abnormality, then it automatically generates and sends an alert notification, and/or initiates a process to block or freeze or cancel a transaction/a command that was determined to be non-authorized or potentially compromised; for example, (i) a transaction/a command that appears in the Audit Log of the third-party service provider as allegedly incoming from User Adam on date D1 and time T1, but that is entirely absent from the monitored and tracked user interactions that User Adam performed on Date D1 around time T1 (e.g., plus and minus N minutes around time-point T1); or, (ii) a transaction/a command in which User Bob has defined or configured or modified an online ad campaign for his enterprise via the Google Ads dashboard, wherein the audit log on the Google Ads platform indicates that User Bob authorized (on date D2, at time T2) an advertising budget of 5,000 dollars, whereas the monitoring of interactions of User Bob via his end-user device, at or around that time-point, indicate that he actually authorized only a budget of 500 dollars (and thus, possibly a malicious code or malware has interfered and replaced the budget amount with a larger number in order to maliciously deplete the funds of Bob's organization).

The AuthenticAction service for organizations and enterprises may thus protect them against malicious actions that are performed with stolen/compromised credentials, or that are performed via a running malware; and further enables such organizations and enterprises to have and to utilize a true audit of employees taking actions or providing commands or submitting transactions on behalf of the organization/enterprise or while utilizing a computerized device of the organization/enterprise, thus providing an internal audit trail that can later show who exactly has submitted a particular transaction/command/action on behalf of the organization/enterprise towards a third-party provider or via a particular console or portal or dashboard, as well as a reliable audit trail of Which particular transaction data/ command data were actually entered by that employee or team member. Some embodiments do not require any code integration; but rather, may utilize a granted permission/ authorization for the AuthenticAction server to access the third-party audit log or history logs or transaction logs, and/or a digital copy of such logs that the organization/ enterprise may obtain/export/upload to the AuthenticAction server (and such upload may optionally be performed in an automatic manner; such as, by configuring the third-party system to export, every 1 minute or every 60 minutes or every 24 hours, an activity log/command log/transaction log, which is automatically sent only to the organization/enterprise, which in turn automatically uploads it to the AuthenticAction server). Other deployment architectures may be used. In some embodiments, the lack of requirement for code integration may facilitate rapid and efficient deployment by the organization/enterprise, optionally even implementing the AuthenticAction service as a self-service or a self-hosted/self-run service; or as a cloud-based/remote service that is provided by a trusted AuthenticAction server. It is noted that the organization/enterprise may be any suitable type of entity, and need not necessarily be a financial institution or an online merchant/retailer; rather, any entity (e.g., a non-for-profit entity; a government unit; a healthcare facility; an educational facility) whose Information Technology systems may interact with a third-party provider (e.g., with AWS, with GCP, with Azure, with Cloudflare, with Google Ads, or the like), may benefit from the AuthenticAction service for verification and auditing of any transaction/command/action that was submitted to such platform on behalf of such organization/enterprise.

Figure 6:
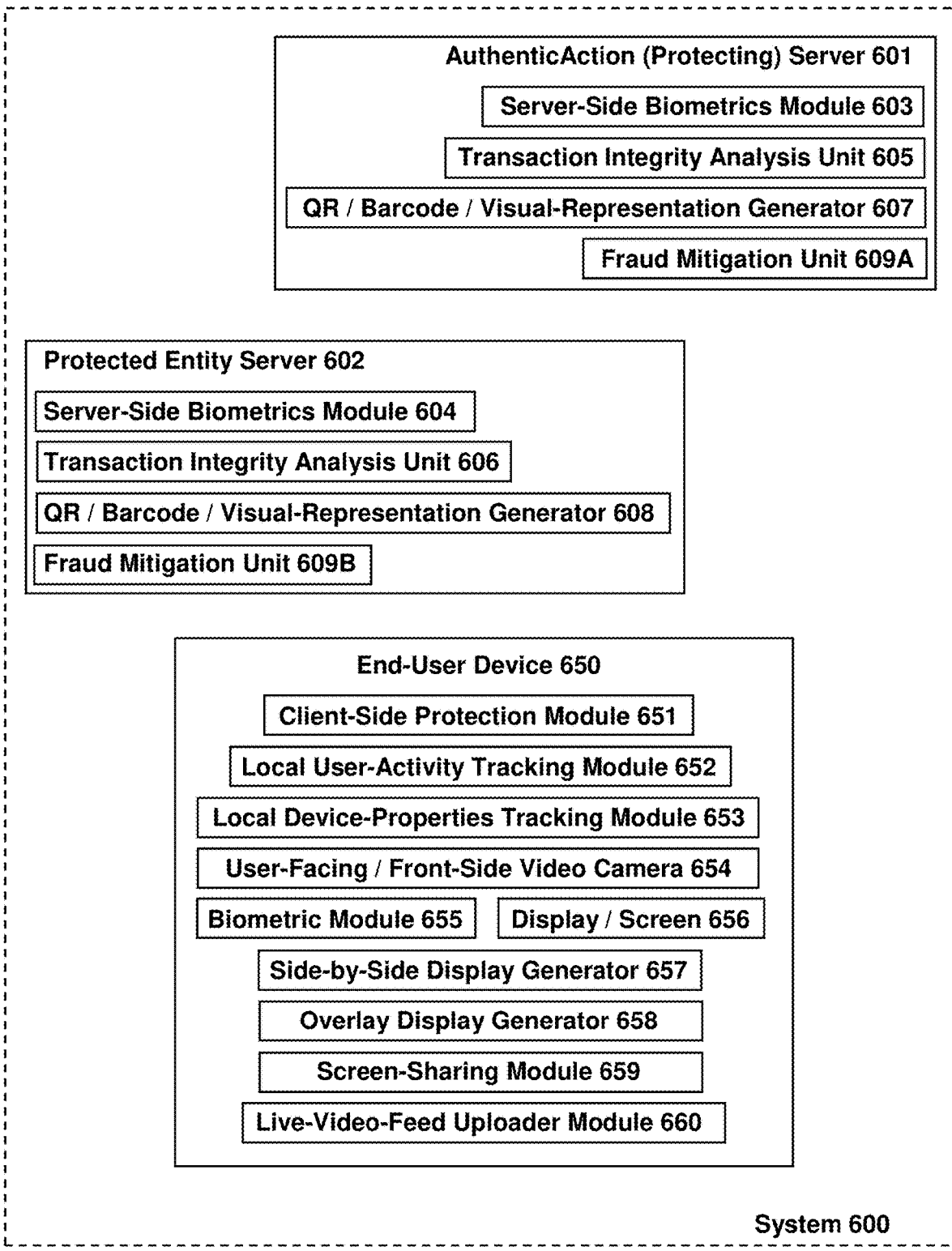
FIG. 6 is a schematic block-diagram illustration of a system, in accordance with some demonstrative embodiments.

Reference is made to FIG. 6, which is a schematic block-diagram illustration of a system 600, in accordance with some demonstrative embodiments. For example, an AuthenticAction (Protecting) Server 601 may operate as a trusted remote server, to protect users or clients or customers of a Protected Entity Server 602 (e.g., a banking server, an online merchant server, an online retailer server), against cyber-attacks and/or fraudulent transactions and/or malicious activity that may be attempted or performed by human cyber-attackers and/or by automated or malware-based or machine-based cyber-attackers. For demonstrative purposes, Server 601 and Server 602 are shown as two separate entities, optionally operated by two separate owners; such as, a cyber-security services provider may operate Server 601, and a Protected Entity may operate Server 602. In other embodiments, servers 601 and 602 may be owned by the same entity (e.g., by the Protected Entity, such as by the bank itself, by the online merchant itself). In other embodiments, some or all the features or operations, that are described above and/or herein as provided by server 601, may actually be implemented as part of server 602; or as part of both server 601 and server 602. In other embodiments, some or all the features or operations, that are described above and/or herein as provided by server 602, may actually be implemented as part of server 601; or as part of both server 601 and server 602.

The end-user utilizes an End-User Device 650; for example, a laptop computer, a desktop computer, a tablet, a smartphone, or the like. Device 650 may include a Client-Side Protection Module 651; for example, implemented as a stand-alone application or "app" or mobile app, or as a native application, or as an integral part of an Operating System (OS) or as an add-on to an Operating System, or as an integral part of a Web browser, or as an add-on or extension or plug-in to a Web browser. The Client-Side Protection Module 651, and particularly a Local User-Activity Tracking Module 652 thereof, monitors/tracks/logs/records, locally at Device 650, all the user gestures and/or user interactions with the Device 650 and/or with one or more input units of the Device 650 (e.g., keystrokes, mouse gestures, mouse clicks, touchpad gestures and clicks, touchscreen gestures); and similarly, a Local Device-Properties Tracking Module 653 monitors/tracks/logs/records, locally at Device 650, device properties of Device 650 (e.g., three-dimensional/spatial movement of the entirety of the device, tilt, tremor, acceleration, deceleration, accelerometer data, spatial orientation of the device, angular orientation of the device, portrait versus landscape handling of the device, compass unit data, gyroscope data, device orientation data).

One or more particular activities or "Actions", that may be performed (or requested, or commanded, or initiated) on or via Device 650, may be pre-defined—by the user of Device 650, or by an administrator of Device 650, or by the Protected Entity and its Protected Entity Server 602—as Actions or Activities that require "increased security" or "elevated security", or that are "high risk" or "higher risk" (relative to other actions or activities). For example, a banking server or a banking application or a banking web-page or web-site, may define that: (i) a user request to Transfer Funds or to Create a New Payee, would be regarded as "elevated security" actions; whereas, (ii) a user request to View his Balance or to View the Frequently Asked Questions would not be regarded as "elevated security" actions. Device 650, via its Client-Side Protection Module 651, may be configured such that an attempt or a request or a command to initiate an action or an activity that was pre-defined or pre-configured as requiring "elevated security", would invoke the Client-Side Protection Module 651 to perform a new session of AuthenticAction protection that concurrently verifies and binds the user identity authentication and the transaction data integrity. In some embodiments, the invoking may be performed via a code segment, in the banking application or web-site or web-page or server-side code or client-side code, that triggers a new AuthenticAction protection if a particular user-command is entered or requested or initiated.

Upon such invoking, the Client-Side Protection Module 651 activates or turns-on a user-facing/front-side video camera 654 of the Device 650; which captures and records a live video feed of the user who is currently interacting with Device 650, while that user is manually interacting with Device 650 and entering data into Tillable fields and/or while the user is engaging with other on-screen GUI elements to convey transaction data (e.g., drop-down menu, selection buttons, free-text fields, or the like).

In some embodiments, a Biometric Module 655 performs continuous biometric authentication of the user; for example, by comparing the freshly-captured video or video frames, to one or more reference images or video-frames or video-segments of the authorized/registered/legitimate user or account owner or registered account-owner (e.g., pre-provided upon initial registration or on-boarding or during initial account creation). The Biometric Module 655 may be part of only Device 650; or, the Biometric Module 655 may operate on a remote server (601 and/or 602) which may receive from Device 650 the biometric samples (e.g., uploaded video feed) over a secure communication channel (e.g., over HTTPS, over SSL-TLS).

The Client-Side Protection Module 651 is further configured to cause a Display/Screen 656 of Device 650, to continuously display therein the live video feed that is continuously captured by the user-facing/front-side video camera 654. This, by itself, may deter some attackers (humans, or machine-based) from continuing or from performing an attack, as the attacker now knows—and even sees—that his own face is being captured and shown to him on that same device that he is utilizing or exploiting.

In some embodiments, a Side-by-Side Display Generator 657 is configured and is operable such that (i) the live video feed from the user-facing/front-side video camera 654 of Device 650, and (ii) the one or more fillable fields and/or other user-engageable GUI elements for entering transaction data, are displayed on the same Display/Screen 656 of Device 650, one near each other, side by side, without hiding each other, without overlaying on each other, as two on-screen components, each one of them displayed in each own in-screen region.

In other embodiments, an Overlay Display Generator 658 is configured and is operable such that (i) the live video feed from the user-facing/front-side video camera 654 of Device 650, and (ii) the one or more fillable fields and/or other user-engageable GUI elements for entering transaction data, are displayed on the same Display/Screen 656 of Device 650, as two layers or as two overlay components, one on top of the other; or such that one of them is displayed as a Background Layer (optionally, slightly faded-out or having reduced brightness or reduced contrast or reduced colors), and the other one of them is displayed on top of it as an Overlay Foreground Layer (optionally, without any faded-out effect, and/or with regular or increased brightness or contrast or colors). For example, the one or more fillable fields and/or other user-engageable GUI elements for entering transaction data are the Foreground Layer; and the live video feed from the user-facing/front-side video camera 654 is the Background Layer behind it; and each of them is dynamically and continuously self-updating—the live video feed reflects the currently-captured camera feed, and the fillable fields (or other GUI elements) dynamically reflect the transaction data that the user has already entered/typed/selected through them. It is noted that the above operations are performed while the user is entering transaction data, and/or thinking which data to enter; and Before the user pressed or clicked a "submit" button; and not only After the user has submitted the transaction data.

Additionally, a Screen-Sharing Module 659 runs on Device 650, as part of the Client-Side Protection Module 651 or as a module that is associated with the Client-Side Protection Module 651. The Screen-Sharing Module 659 performs continuous, live, real-time, screen sharing of the entire screen of Device 650, over a secure communication channel (e.g., over HTTPS, over SSL-TLS), with a remote server (601 and/or 602). Optionally, the remote server 601/602 may further perform continuous or periodical biometric authentication of the interacting user, on the server side, via a Server-Side Biometrics Module 603/604; based on the Shared Screen which includes therein the live video feed of the user-facing/front-side video camera 654; as an additional layer of security or user-authentication; by comparing (I) one or more video frame(s) having inside them the live video feed of the user-facing/front-side video camera 654—as displayed on the Display/Screen 656 which is then shared via Screen-Sharing Module 659 over a secure communication channel with the remote server 601/602, with (II) one or more reference images/frames/video segments of the authorized user (e.g., established during account creation/registration/on-boarding).

Meanwhile, as the user is entering transaction data on the Device 650, and even Before the user selects to actively and intentionally Submit any such transaction data to any remote server, the Local User-Activity Tracking Module 652 and the Local Device-Properties Tracking Module 653 continuously collect their data, and continuously or periodically (e.g., every 1 second, every 3 seconds, every T milliseconds) transmit their so-far collected data, over a secure communication channel, to remote server 601/602; to reflect which client-side interactions were performed so far.

At the remote server 601/602, optionally, a Transaction Integrity Analysis Unit 605/606 may operate to perform one or more integrity checks of the transaction data, in order to already spot or detect an ongoing fraud attempt, even before the user has actively selected to Submit the transaction data.

In a first example, the Transaction Integrity Analysis Unit 605/606 detects that the data that is received from the Local User-Activity Tracking Module 652 indicate that the user typed 7 characters so far (e.g., in the field of Beneficiary Account Number; or in all the fillable fields so far); whereas, the data that appears within the Screen-Shared version of the Screen of Device 650, as transmitted continuously to the remote server 601/602 via the Screen-Sharing Module 659, shows that 9 characters are in that particular on-screen field; thus triggering a determination or decision or estimation, by the Transaction Integrity Analysis Unit 605/606, that data that was allegedly entered by the user, was replaced or was faked by a cyber-attacker or by a man-in-the-middle attack or by a man-in-the-browser attack or via a malware that maliciously runs on Device 650.

In a second example, the Transaction Integrity Analysis Unit 605/606 detects that the data that is received from the Local User-Activity Tracking Module 652 indicate that the user has engaged with only one fillable field so far (e.g., only the field of Beneficiary Account Number); whereas, the data that appears within the Screen-Shared version of the Screen of Device 650, as transmitted continuously to the remote server 601/602 via the Screen-Sharing Module 659, shows that two or more fillable fields already contain user-entered data; thus triggering a determination or decision or estimation, by the Transaction Integrity Analysis Unit 605/606, that data that was allegedly entered by the user, was replaced or was faked by a cyber-attacker or by a man-in-the-middle attack or by a man-in-the-browser attack or via a malware that maliciously runs on Device 650.

In a third example, the Transaction Integrity Analysis Unit 605/606 detects that the data that is received from the Local Device-Properties Tracking Module 653 indicate that Device 650—which is a portable or hand-held device such as Tablet or Smartphone—is entirely idle and non-moving and non-shaking and non-vibrating and entirely horizontal for the past ten minutes; whereas, concurrently-incoming data from the Local User-Activity Tracking Module 652 indicates that a user is actively engaging with Device 650, entering/typing data, making on-screen selections, and otherwise engaging with Device 650 in a manner that is not expected to allow Device 650 to remain entirely idle and non-moving and non-shaking and non-vibrating and entirely horizontal; thus triggering a determination or decision or estimation, by the Transaction Integrity Analysis Unit 605/606, that data that was allegedly entered by the user, was actually entered by a malware that runs secretly on the Device 650, or by a remote cyber-attacker that remotely controls Device 650 via a Remote Access Trojan (RAT) malware, while the authorized/legitimate user is sleeping in bed and the smartphone/tablet is idly laying on the desk nearby.

In a fourth example, the Transaction Integrity Analysis Unit 605/606 detects (e.g., by utilizing computer vision analysis, and/or by using Optical Character Recognition (OCR) or other image-analysis/video-analysis techniques), that the shared screen video feed, that is received over a secure communication channel from the Screen-Sharing Module 659 of Device 650, shows that Device 650 is continuously and exclusively utilized in the past 5 minutes by a Word Processing application that continuously runs on the full screen of Device 650 (as shown in the screen-shared version that is continuously shared with remote server 601/602); whereas, concurrently, the Local User-Activity Tracking Module 652 indicates that transaction data is manually typed or entered into fillable fields of a banking application/web site/web-page, which is not seen on the screen-shared version at all; thus triggering a determination or decision or estimation, by the Transaction Integrity Analysis Unit 605/606, that data that was allegedly entered by the user, was actually entered by a malware that runs secretly on the Device 650, or by a remote cyber-attacker that remotely controls Device 650 via a Remote Access Trojan (RAT) malware, while the authorized/legitimate user was performing Word Processing activities on his Device 650.

In some embodiments, a QR/Barcode/Visual-Representation Generator 607/608 may operate on remote server 601/602; and may dynamically/continuously/periodically (e.g., every 1 second, every 2 seconds, every T milli-seconds) generate and/or update a unique QR/Barcode/Visual-Representation Generator, that visually encodes and represents data (e.g., via a series or matrix or array of pixels having black-or-white values to encode binary values; or via a series or set or matrix or array of pixels having a particular pallet of N colors, such as 8 different colors in total, to encode octa-decimal values); and the visually-encoded/visually-represented data is, for example, an aggregation of (i) some, or all, of the transaction data that was received so far from (or, that was received within the past T seconds) the Local User-Activity Tracking Module 652; and/or (ii) some, or all, of the device properties data that was received so far (or, that was received within the past T seconds) from the Local Device-Properties Tracking Module 653; and/or (iii) some, or all, of the biometrics data/biometric sample(s) that were obtained so far from the user-facing/front-side video camera 654; and/or (iv) some, or all, of the shared-screen version (or one or more frames thereof) that was shared so far by the Screen-Sharing Module 659; and/or (v) one or more video frames that were uploaded directly from the Device 650 and its user-facing/front-side video camera 654, via the Client-Side Protection Module 651 and via a Live-Video-Feed Uploader Module 660, which directly upload the live video feed as captured by the user-facing/front-side video camera 654 to the remote server 601/602, as a direct upload of a live video feed and Not as a "shared screen" version that includes a small-size version of the live video feed; and/or (vi) transaction data (partial, or full) that were actually Submitted from Device 650 towards server 601/602, in response to a Submit command that the user actively performed on Device 650.

In some embodiments, the QR/Barcode/Visual-Representation Generator 608 generates a QR/Barcode/Visual-Representation that is: (i) a cryptographic hash result of the above-mentioned values (all of them, or some of them), via a one-way cryptographic hash function and optionally utilizing a secret "salt value" that only the server (601/602) knows; and/or (ii) a cryptographic result of a cryptographic encryption algorithm or a cryptographic signing algorithm that receives as input one-or-more of the above-mentioned data-items, and generates as output a fixed-size numerical value or string; and/or a cryptographic result of a cryptographic encryption algorithm or a cryptographic signing algorithm that receives as input one-or-more of the above-mentioned data-items, and generates as output a non-fixed-size numerical value or string.

The numerical output or string-based output of the QR/Barcode/Visual-Representation Generator 608 is converted into a QR/Barcode/Visual-Representation; and is sent back, over a secure communication channel (e.g., over HTTPS, over SSL-TLS) to the Client-Side Protection Module 651 on Device 650; which in turn, causes or commands the Display/Screen 656 of Device 650 to continuously (or momentarily) display on the screen the received, server-side generated, server-side encoded, QR/Barcode/Visual-Representation; which is then Screen-Shared, via the Screen-Sharing Module 659 of Device 650, continuously or at least periodically or momentarily, back towards the remote server 601/602 over a secure communication channel; whose Transaction Integrity Analysis Unit 606/607 then compares and checks whether: (I) the incoming QR/Barcode/Visual-Representation that appears in the Screen-Shared version of the screen of Device 650 that is shared via the Screen-Sharing Module 659, matches (or is identical too; or is sufficiently similar to, beyond a pre-defined threshold value of similarity), (II) the previously or most-recently server-generated and server-stored version of the QR/Barcode/Visual-Representation that was generated at the QR/Barcode/Visual-Representation Generator 607/608. If a mismatch is detected, then a decision or estimation or determination is reached that Device 650 is compromised or attacked or exploited, and/or that the communication channel between Device 650 and server 602 is compromised or attacked or exploited. Such integrity check may prevent or block or mitigate an attack, in which the content of the screen of the Device 650—which are screen-shared continuously and dynamically with the remote server 601/602—are replaced or augmented or modified or tampered-with, by a human attacker or by a malware-based attack module that attempts to create and/or insert and/or add a fake QR/Barcode/Visual-Representation into the screen of the Device 650, based on fake or modified transaction data; since only the remote server 601/602 knows how to correctly generate the authentic QR/Barcode/Visual-Representation that is based on the particular data-items collected locally and/or remotely, and further based on a secret cryptographic seed/salt-value/key/hashing formula/encryption formula that is known only to the server (601/602) and is not known to (and cannot be deduced by) an attacker or an malware-based attack module.

In some embodiments, in order to further generate obstacles for an attacker, the server-side generated QR/Barcode/Visual-Representation, that is transmitted over a secure communication channel to Device 650, is then displayed on the screen of Device 650 as a Background Layer (e.g., optionally also slightly faded-out, or having reduced contrast/reduced brightness/reduced colors), or as a background component that is shown behind—or that is at least partially hidden by—a Foreground on-screen layer or component (which may be, for example: one or more fillable fields in the form for entering transaction data; one or more user-engageable GUI elements of such form for entering transaction data; the live video feed of the front-side/user-facing camera); such that an attacker or an attack module may not be able to efficiently or easily produce or replace such a complex, layer-over-layer image or dynamic video that is also being screen-shared to the remote server 601/602 in real time; as such malicious generation or modification would require real-time video generation and encoding capabilities that are beyond regular capabilities of a human attacker or an automated malware, and particularly also since at least one of the components of such real-time video is the server-side generated QR/Barcode/Visual-Representation that is not known to the attacker and cannot be deduced or faked by the attacker.

If a fraudulent or malicious activity is determined or estimated, then a Fraud Mitigation Unit 609A/609B is automatically triggered or activated, to perform one or more pre-defined fraud mitigation operations; for example: blocking/denying/freezing/un-authorizing/placing a hold on the submitted or analyzed transaction, or the transaction that is about to be submitted, or the transaction that was most-recently submitted from Device 650; forcing a log-out of the user from an active usage session or from the website/application; generating and/or sending warning notifications to the legitimate user and/or to one or more system administrators or recipients; initiating a requirement for the user to perform additional user-authentication steps or factors (e.g., to enter a one-time password or a one-time code that is sent to the account owner via email or SMS text message; to contact a customer service representative of the Protected Entity by phone or in person; to provide correct answers to pre-defined security questions); or the like.

In some embodiments, the QR/Barcode/Visual-Representation is a server-side generated item, that is secretly generated by server 601/602 and is then sent over a secure communication channel to the Client-Side Protection Module 651 on Device 650, which then displays that server-side generated QR/Barcode/Visual-Representation on the screen of the device 650, which is then dynamically and continuously (or, at least periodically or momentarily) Screen-Shared back towards the remote server 601/602 as an additional security measure to further verify the integrity of the transaction data. In other embodiments, the role of the components may be swapped or reversed; for example, in some implementations, a client-side unit or sub-unit of the Client-Side Protection Module 651 may generate its own, unique, QR/Barcode/Visual-Representation based on the actual data that the Local User-Activity Tracking Module 652 and/or the Local Device-Properties Tracking Module 653 have actually tracked and recorded locally, and based on a locally-stored (in Device 650) secret cryptographic key/seed/hashing function/encryption function/key; and such locally-generated QR/Barcode/Visual-Representation may be sent from Device 650 to remote server 601/602 over a secure communication channel that is external to the regular communication channel that regularly transports the transaction data from the Device 650 to remote server 601/602; and the Client-Side Protection Module 651 may further cause the screen of the Device 650 to display that locally-generated QR/Barcode/Visual-Representation on the screen of the Device 650, optionally as a background layer behind the live video feed of the user-facing camera and/or behind the Tillable fields of the transaction data form; and such screen may be continuously Screen-Shared by the Screen-Sharing Module 659 towards remote server 601/602, which may then utilize its Transaction Integrity Analysis Unit 606/607 to verify that there is a match between (i) the QR/Barcode/Visual-Representation as shown on the Shared-Screen version, and (ii) the QR/Barcode/Visual-Representation as generated locally on Device 650 and then transported to remote server 601/602 over a secondary, separate, secure communication channel; as such comparison, and possible mismatch, may indicate whether Device 650 is compromised, and/or whether one or more of the communication channels that Device 650 is utilizing is compromised.

It is also noted that the Applicant has realized that for purposes of triggering a possible-fraud alert and for prevention of some (and not necessarily all) cyber-attacks or fraud attempts or malicious activities, it can be beneficial and advantageous to implement the methods and systems that are described above and/or herein, and to raise or generate a possible-fraud alert and/or to trigger fraud-prevention or fraud-mitigation operations even if the level of confidence in the accuracy of the decision is less than 100 percent. It is noted that in the field of cyber-security, protection of 100 percent against attacks or against fraud or against compromising attempts is rarely obtained or, in fact, is never actually obtained; and in this specific field, a cyber-security system that successfully prevents 80 or 85 or 90 or 95 percent of fraud attempts, by utilizing a particular fraud detection method and/or system, is still considered to be highly useful and provides high utility and benefits to the relevant protected entity (e.g., a bank, a financial institution, an online merchant, an online retailer, or the like); and it is also noted that the remaining scenarios, in which a "false positive" error may occur or a "false negative" error may occur, may be covered by other fraud-prevention techniques that may be employed in parallel or in series.

It is noted that embodiments of the present invention cannot be regarded as merely "presentation of data" on a computerized screen; and such incorrect characterization of some embodiments is not in line with the innovative Structure and Functionalities that the present invention provides, and the Functional Advantages that the present invention provides to computerized systems and to computerized devices. In some embodiments, the system and the determination to dynamically and continuously display—on the screen of the end-user device itself—concurrently while the user is entering transaction data, the live video feed of the user-facing camera, side-by-side or near or Behind the fillable fields (e.g., as a Background Layer relative to such fillable fields or to the transaction data form), provide Cyber-Security functionalities and advantages. They provide not only a "mental" barrier or deterrence towards a human attacker/impostor, that suddenly sees his own face on the screen in front of him (e.g., attacker Adam is utilizing the laptop computer of legitimate user Bob who logged-in to his bank account and then left his laptop un-attended for five minutes, as a "coffee break attack"); but also, actively operates to prevent/block/frustrate/disrupt an Automated Malware that attempts to perform such fraudulent transactions, as the presentation of the user-facing camera's live video feed is also uploaded back (over a secure and different/separate communication channel, relative to the Transaction Data itself) to a trusted remote server; and also, by additionally generating and displaying, side-by-side or nearby or as a difficult-to-forge/difficult-to-recreate dynamically-chancing Background Layer which has a QR Code/Barcode/Visual Representation that represents (in a server-encoded manner) one or more of the transaction data-items and/or the transaction data and/or the transaction metadata and/or the user-identity data and/or the device properties and/or the locally-captured user-interactions and/or the locally-captured device properties, such that this server-generated QR Code/Barcode/Visual Representation—which is displayed on the screen of the end-user device—is also uploaded back (over a secure and different/separate communication channel, relative to the Transaction Data itself) to a trusted remote server; thereby providing additional layers of cyber-security and cyber protection against fraud attempts and against cyber-attacks against the computerized system (e.g., the remote server of the bank/merchant/Protected Entity) and/or against the end-user device.

Some embodiments provide a computerized method comprising: while a user interacts with an electronic device to enter transaction data for an electronic transaction intended to be performed online via a remote server: activating a user-facing camera of the electronic device, and capturing a live video feed of the user while he enters transaction data; and causing said live video feed to be continuously displayed in a particular region of a screen of the electronic device of the user while the user enters transaction data. The concurrent display of the live video feed from the user-facing camera, on the screen of the electronic device, while the user enters transaction data for said electronic transaction intended to be performed online via said remote server, reduces cyber-attack attempts of a human attacker or a malware that impersonates said user.

In some embodiments, the method displays said live video feed as a dynamically-changing background layer behind one or more on-screen Tillable data-fields in which said user inputs data and while said user is inputting data. In some embodiments, the method further comprises: performing Screen Sharing of the screen of the electronic device, with a trusted remote server, while the user is entering transaction data on said electronic device, and while the screen of said electronic device displays both (i) the live video feed captured by the user-facing camera and (ii) the transaction data being entered by the user. In some embodiments, the method comprises: causing the screen of the electronic device to further display a server-generated visual representation, that was generated at the trusted remote server; wherein the server-generated visual representation is a visual encoding of user-entered transaction data that was received at the trusted remote server. In some embodiments, the method comprises: causing the electronic device to continuously perform Screen Sharing, of the screen of the electronic device, towards said trusted remote server, while the user is entering transaction data, and while the screen of the electronic device shows the live video feed of the user-facing camera, and while the screen of the electronic device shows the server-generated visual representation; at said trusted remote server, detecting a mismatch between (I) transaction data entered by the user as tracked locally on said electronic device, and (II) the server-generated visual representation which encodes transaction data that was actually received at said trusted remote server; and based on said mismatch, determining to block or deny the transaction.

In some embodiments, the method displays said live video feed from the user-facing camera at a first region of the screen of the electronic device, concurrently while transaction data is entered at a second, different, region of the screen of the electronic device. In some embodiments, the method further comprises: performing Screen Sharing of the screen of the electronic device, with a trusted remote server, while the user is entering transaction data on said electronic device, and while the screen of said electronic device displays both (i) the live video feed captured by the user-facing camera and (ii) the transaction data being entered by the user. In some embodiments, the method comprises: causing the screen of the electronic device to further display a server-generated visual representation, that was generated at the trusted remote server; wherein the server-generated visual representation is a visual encoding of user-entered transaction data that was received at the trusted remote server. In some embodiments, the method comprises: causing the electronic device to continuously perform Screen Sharing, of the screen of the electronic device, towards said trusted remote server, while the user is entering transaction data, and while the screen of the electronic device shows the live video feed of the user-facing camera, and while the screen of the electronic device shows the server-generated visual representation; at said trusted remote server, detecting a mismatch between (I) transaction data entered by the user as tracked locally on said electronic device, and (II) the server-generated visual representation which encodes transaction data that was actually received at said trusted remote server; and based on said mismatch, determining to block or deny the transaction.

In some embodiments, the method comprises: (a) while a user interacts with an electronic device to enter transaction data for an electronic transaction, activating a user-facing camera of the electronic device, and capturing a live video feed of the user; and causing said live video feed to be continuously displayed in a particular region of a screen of the electronic device of the user while the user enters transaction data; (b) while the user interacts with the electronic device and enters transaction data, locally capturing input-unit interactions that were performed by the user, and transmitting them over a secure communication channel to a trusted remote server, before the user provided a Submit command via said electronic device; (c) at said trusted remote server, generating a visual representation that encodes user-entered transaction data that was captured locally in step (b) and was transmitted over the secure communication channel to a trusted remote server; (d) sending from the trusted remote server, to the electronic device of the user, said visual representation that encodes user-entered transaction data; and causing the screen of the electronic device of the user to display said visual representation; (e) obtaining via screen sharing, from the electronic device to said trusted remote server, at least one video frame that includes therein said visual representation; and verifying integrity of said electronic transaction based on a match between (i) the visual representation as it appears in the screen sharing video frame that was sent from the electronic device to the trusted remote server, and (ii) the visual representation as previously generated at said trusted remote server.

In some embodiments, said visual representation is a visual encoding selected from the group consisting of: a barcode, a matrix barcode, a Quick Response (QR) code.

In some embodiments, said visual representation is a visual encoding of at least: a beneficiary account number of the electronic transaction, a monetary amount of the electronic transaction.

In some embodiments, the method comprises: dynamically changing and updating said visual representation, at said trusted remote server, based on additional transaction data that the user typed or entered at the electronic device and that the electronic device sent to the trusted remote server over the secure communication channel; dynamically displaying, on the screen of the electronic device, updated versions of the visual representation that said trusted remote server generates and sends to the electronic device over the secure communication channel.

In some embodiments, the method comprises: detecting a mismatch between (i) the visual representation as it appears in the screen sharing video frame that was sent from the electronic device to the trusted remote server, and (ii) the visual representation as most-recently generated at said trusted remote server; and based on said mismatch, blocking or denying said electronic transaction.

In some embodiments, the method comprises: continuously authenticating identity of said user, based on facial recognition of his face as continuously being captured by the user-facing camera of the electronic device while the user is entering transaction data; based on one or more reference images of the face of said user.

In some embodiments, the visual representation that was generated by the trusted remote server and was sent from the trusted remote server to the electronic device, is displayed as a background layer on the screen of the electronic device, while the user enters data into user-fillable fields that are displayed as a foreground layer.

In some embodiments, the video feed that is continuously captured by the user-facing camera of the end-user device, is displayed as a background layer on the screen of the electronic device, while the user enters data into user-fillable fields that are displayed as a foreground layer.

In some embodiments, the live video feed that is continuously captured by the user-facing camera of the end-user device, is displayed as a background layer on the screen of the electronic device, and is also continuously shared via Screen Sharing towards said trusted remote server, while the user enters data into user-fillable fields that are displayed as a foreground layer.

In some embodiments, the visual representation that was generated by the trusted remote server and was sent from the trusted remote server to the electronic device, is displayed as a first background layer on the screen of the electronic device, while the user enters data into user-fillable fields that are displayed as a foreground layer; wherein live video feed that is continuously captured by the user-facing camera of the end-user device, is displayed as second background layer on the screen of the electronic device, while the user enters data into user-fillable fields that are displayed as the foreground layer.

In some embodiments, the method comprises: generating by said trusted remote server a singular sealed record that binds together (i) user authentication data and (ii) transaction integrity data.

In some embodiments, the method comprises: generating by said trusted remote server a singular sealed record that binds together (i) user authentication data and (ii) transaction integrity data, based on at least: (A) user interactions as monitored locally at input units of the electronic device while the user enters transaction data; (B) continuous facial recognition of the user based on said live video feed, continuously while the user enters transaction data; (C) a challenge-and-response mechanism, in which the trusted remote server (C1) generates said visual representation based on transaction data entry that was monitored on the electronic device, and (C2) sends the visual representation to the electronic device via the secure communication channel; wherein the electronic device is configured to display on its screen the visual representation that was sent by the trusted remote server, and wherein the electronic device is further configured to continuously perform screen sharing with said trusted remote server.

In some embodiments, said generating of the singular sealed record is further based on: (D) user-specific behavioral data that is extract from user gestures and user interactions.

In some embodiments, said generating of the singular sealed record is further based on: (E) one or more device properties of said electronic device, extracted while said user enters transaction data on said electronic device; wherein the one or more device properties include at least one of: device accelerometer data, device gyroscope data, device compass-unit data, device spatial orientation data.

Some embodiments may perform steps or operations such as, for example, "determining", "identifying", "comparing", "checking", "querying", "searching", "matching", "estimating", and/or "analyzing", by utilizing, for example: a pre-defined threshold value to which one or more parameter values may be compared; a comparison between (i) sensed or measured or calculated value(s), and (ii) pre-defined or dynamically-generated threshold value(s) and/or range values and/or upper limit value and/or lower limit value and/or maximum value and/or minimum value; a comparison or matching between sensed or measured or calculated or collected data, and one or more values as stored in a look-up table or a legend table or a list of reference value(s) or a database of reference values or a ranges of reference-values; a comparison or matching or searching process which searches for matches and/or identical results and/or similar results and/or sufficiently-similar results (e.g., within a pre-defined threshold level of similarity; such as, within 5 percent above or below a pre-defined threshold value), among multiple values or limits that are stored in a database or look-up table or that are defined by comparison rules or matching rules; utilization of one or more equations, formula, weighted formula, and/or other calculation in order to determine similarity or a match between or among parameters or values; utilization of comparator units, lookup tables, threshold values, conditions, conditioning logic, Boolean operator(s) and/or other suitable components and/or operations.

Functions, operations, components and/or features described herein with reference to one or more embodiments of the present invention, may be combined with, or may be utilized in combination with, one or more other functions, operations, components and/or features described herein with reference to one or more other embodiments of the present invention. The present invention may thus comprise any possible or suitable combinations, re-arrangements, assembly, re-assembly, or other utilization of some or all of the modules or functions or components that are described herein, even if they are discussed in different locations or different chapters of the above discussion, or even if they are shown across different drawings or multiple drawings.

While certain features of some demonstrative embodiments of the present invention have been illustrated and described herein, various modifications, substitutions, changes, and equivalents may occur to those skilled in the art. Accordingly, the claims are intended to cover all such modifications, substitutions, changes, and equivalents.

What is claimed is:

1. A method comprising:
while a user interacts with an electronic device to enter transaction data for an electronic transaction intended to be performed online,
activating a user-facing camera of the electronic device, and capturing a live video feed of the user while he enters transaction data;
and causing said live video feed to be continuously displayed as a dynamically-changing background layer in a particular region of a screen of the electronic device of the user while the user enters transaction data into one or more on-screen fillable data-fields that are concurrently displayed in a foreground layer relative to said live video feed; and enabling the user to type data into said one or more on-screen fillable data-fields while the live video feed is continuously displayed in the background layer behind said one or more on-screen fillable data-fields;
continuously performing Screen Sharing of the screen of the electronic device, with a trusted remote server, while the user is entering transaction data on said electronic device into said one or more on-screen fillable data-fields while the live video feed is continuously displayed in the background layer behind said one or more on-screen fillable data-fields, and while the screen of said electronic device displays both (i) the background layer that dynamically shows the live video feed captured by the user-facing camera and (ii) the foreground layer that dynamically shows the transaction data being entered by the user;

wherein a combination of (I) concurrent display of the live video feed from the user-facing camera, as said background layer behind said one or more on-screen fillable data-fields on the screen of the electronic device, while the user enters transaction data for said electronic transaction intended to be performed online, and (II) continuous Screen Sharing of the screen of said electronic device that displays both (i) the background layer that dynamically shows the live video feed captured by the user-facing camera and (ii) the foreground layer that dynamically shows the transaction data being entered by the user, reduces cyber-attack attempts of a human attacker or a malware that impersonates said user;

at said trusted remote server, analyzing content of one or more video frames that were received at the trusted server via Screen Sharing by the electronic device, and checking whether (I) data shown in said content via said Screen Sharing matches (II) transaction data transmitted from the electronic device to the trusted remote server.

2. The method of claim 1, comprising:

continuously authenticating identity of said user, based on facial recognition of his face that is continuously being captured by the user-facing camera of the electronic device and is shown in the background layer while the user is entering transaction data into one or more fillable data-fields that are shown in the foreground layer and while the electronic device performs continuous Screen Sharing towards the trusted remote server; based on one or more reference images of the face of said user.

3. The method of claim 1, comprising:

generating by said trusted remote server a singular sealed record that binds together (i) user authentication data and (ii) transaction integrity data.

4. The method of claim 3, wherein said generating of the singular sealed record is further based on:

(iii) user-specific behavioral data that is extracted from user gestures and user interactions.

5. The method of claim 4, wherein said generating of the singular sealed record is further based on:

(iv) one or more device properties of said electronic device, extracted while said user enters transaction data on said electronic device;

wherein the one or more device properties include at least one of:

device accelerometer data, device gyroscope data, device compass-unit data, device spatial orientation data.

6. A non-transitory storage medium having stored thereon instructions that, when executed by a machine, cause the machine to perform a method comprising:

while a user interacts with an electronic device to enter transaction data for an electronic transaction intended to be performed online, activating a user-facing camera of the electronic device, and capturing a live video feed of the user while he enters transaction data;

and causing said live video feed to be continuously displayed as a dynamically-changing background layer in a particular region of a screen of the electronic device of the user while the user enters transaction data into one or more on-screen fillable data-fields that are concurrently displayed in a foreground layer relative to said live video feed; and enabling the user to type data into said one or more on-screen fillable data-fields while the live video feed is continuously displayed in the background layer behind said one or more on-screen fillable data-fields;

continuously performing Screen Sharing of the screen of the electronic device, with a trusted remote server, while the user is entering transaction data on said electronic device into said one or more on-screen fillable data-fields while the live video feed is continuously displayed in the background layer behind said one or more on-screen fillable data-fields, and while the screen of said electronic device displays both (i) the background layer that dynamically shows the live video feed captured by the user-facing camera and (ii) the foreground layer that dynamically shows the transaction data being entered by the user;

wherein a combination of (I) concurrent display of the live video feed from the user-facing camera, as said background layer behind said one or more on-screen fillable data-fields on the screen of the electronic device, while the user enters transaction data for said electronic transaction intended to be performed online, and (II) continuous Screen Sharing of the screen of said electronic device that displays both (i) the background layer that dynamically shows the live video feed captured by the user-facing camera and (ii) the foreground layer that dynamically shows the transaction data being entered by the user, reduces cyber-attack attempts of a human attacker or a malware that impersonates said user;

at said trusted remote server, analyzing content of one or more video frames that were received at the trusted server via Screen Sharing by the electronic device, and checking whether (I) data shown in said content via said Screen Sharing matches (II) transaction data transmitted from the electronic device to the trusted remote server.

7. A system comprising:

one or more hardware processors, configured to execute code;

which are operably associated with one or more memory units that are configured to store data;

wherein the one or more hardware processors are configured to perform a process comprising:

while a user interacts with an electronic device to enter transaction data for an electronic transaction intended to be performed online, activating a user-facing camera of the electronic device, and capturing a live video feed of the user while he enters transaction data;

and causing said live video feed to be continuously displayed as a dynamically-changing background layer in a particular region of a screen of the electronic device of the user while the user enters transaction data into one or more on-screen fillable data-fields that are concurrently displayed in a foreground layer relative to said live video feed; and enabling the user to type data into said one or more on-screen fillable data-fields while the live video feed is continuously displayed in the background layer behind said one or more on-screen fillable data-fields;

continuously performing Screen Sharing of the screen of the electronic device, with a trusted remote server, while the user is entering transaction data on said electronic device into said one or more on-screen fillable data-fields while the live video feed is continuously displayed in the background layer behind said one or more on-screen fillable data-fields, and while the screen of said electronic device displays both (i) the background layer that dynamically shows the live video feed captured by the user-facing camera and (ii) the foreground layer that dynamically shows the transaction data being entered by the user;

wherein a combination of (I) concurrent display of the live video feed from the user-facing camera, as said background layer behind said one or more on-screen fillable data-fields on the screen of the electronic device, while the user enters transaction data for said electronic transaction intended to be performed online, and (II) continuous Screen Sharing of the screen of said electronic device that displays both (i) the background layer that dynamically shows the live video feed captured by the user-facing camera and (ii) the foreground layer that dynamically shows the transaction data being entered by the user, reduces cyber-attack attempts of a human attacker or a malware that impersonates said user;

at said trusted remote server, analyzing content of one or more video frames that were received at the trusted server via Screen Sharing by the electronic device, and checking whether (I) data shown in said content via said Screen Sharing matches (II) transaction data transmitted from the electronic device to the trusted remote server.

* * * * *